US007006571B1

(12) United States Patent
Nakaya

(10) Patent No.: US 7,006,571 B1
(45) Date of Patent: Feb. 28, 2006

(54) METHOD OF SYNTHESIZING INTERFRAME PREDICTED IMAGE, AND IMAGE CODING AND DECODING METHOD AND DEVICE THEREFORE

(75) Inventor: Yuichiro Nakaya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/445,088

(22) PCT Filed: Jun. 2, 1998

(86) PCT No.: PCT/JP98/02435

§ 371 (c)(1),
(2), (4) Date: Dec. 2, 1999

(87) PCT Pub. No.: WO98/56185

PCT Pub. Date: Dec. 10, 1998

(30) Foreign Application Priority Data

Jun. 3, 1997 (JP) .................................. 9-144916

(51) Int. Cl.
*H04N 7/12* (2006.01)

(52) U.S. Cl. ............................................. 375/240.16

(58) Field of Classification Search ............. 348/384.1, 348/699; 375/240.01, 240.03, 240.12–240.18, 375/240.2, 240.24; H04N 7/12, 7/32
See application file for complete search history.

(56) References Cited

FOREIGN PATENT DOCUMENTS

| EP | 632657 | 1/1995 |
|----|--------|--------|
| EP | 797357 A2 | 9/1997 |
| EP | 797357 A3 | 9/1997 |
| JP | 08065675 | 8/1994 |

*Primary Examiner*—Richard Lee
(74) *Attorney, Agent, or Firm*—Mattingly, Stanger, Malur & Brundidge, P.C.

(57) ABSTRACT

A method is provided to simplify the computation involved in global motion compensation and warping prediction in coding and decoding of motion compensated image signals. In the synthesis of a global motion compensated predicted image 1203 which predicts a current frame image from an immediately preceding frame image 1202 using motion vectors 1205 of plural representative points having a particular spatial interval in an image frame, a first interpolation/extrapolation 1207 is performed to calculate motion vectors of provisional representative points from motion vectors 1206 of representative points, and a second interpolation/extrapolation 1209 is then performed to calculate motion vectors 1210 for each pixel from motion vectors 1208 of the provisional representative points. A division performed when the predicted image is synthesized can be replaced by a shift computation involving a smaller number of bits, so the processing carried out by a computer or special hardware can be simplified.

31 Claims, 13 Drawing Sheets

METHOD OF SYNTHESIZING INTERFRAME PREDICTED IMAGE, AND IMAGE CODING AND DECODING METHOD AND DEVICE THEREFORE

BACKGROUND OF THE INVENTION

1. Field of the Invention

This invention relates to an image encoding and decoding method, image encoding and decoding device, and more specifically, to a method of synthesizing interframe predicted images by calculating motion vectors of pixels in an image, by performing interpolation/extrapolation of motion vectors of representative points.

2. Background of the Invention:

In high efficiency encoding of a moving image, it is known that interframe prediction (motion compensation) which uses similarities between frames produced at different times has a major effect on data compression. The motion compensating system that has become the mainstream of current image encoding technique is the block matching scheme adopted in H.261, MPEG 1 and MPEG 2 which are the international standards for moving image coding. In this system, the image to be encoded is divided into a large number of blocks, and motion vectors are calculated for each block.

Block matching is currently the most widely used compensation technique, but when the whole image is enlarged, reduced or rotated, motion vectors have to be transmitted for all blocks so the coding efficiency is poor. To deal with this problem, global motion compensation has been proposed wherein the motion vectors of the whole image are represented by a smaller number of parameters (e.g. M. Hotter, "Differential estimation of the global motion parameters zoom and pan", Signal Processing, vol. 16, no. 3, pp. 249–265, March 1989). In this system, the motion vector $(u_g(x,y), v_g(x,y))$ of a pixel $(x, y)$ is expressed in the form:

$$u_g(x,y) = a_0 x + a_1 y + a_2$$
$$v_g(x,y) = a_3 x + a_4 y + a_5 \quad (1)$$

or $$u_g(x,y) = b_0 xy + b_1 x + b_2 y + b_3$$
$$v_g(x,y) = b_4 xy + b_5 x + b_6 y + b_7 \quad (2)$$

and motion compensation is performed using this motion vector. Herein, a0–a5, b0–b7 are the motion parameters. When motion compensation is performed, the predicted image on the transmitting side and receiving side must be the same. For this purpose, the transmitting side can transmit the values of a0–a5 and b0–b7 directly to the transmitting side, however the motion vectors of plural representative points may be transmitted instead. Assume that the coordinates of pixels at the upper left, upper right, lower left and lower right corners of an image are respectively (0,0), (r,0), (0,s), (r,s) where r and s are positive integers. If the horizontal and vertical components of the motion vectors of the representative points (0,0), (r,0), (0,s) are respectively (ua,va), (ub,vb), (uc,vc), equation (1) may be rewritten as:

$$u_g(x, y) = \frac{u_b - u_a}{r} x + \frac{u_c - u_a}{s} y + u_a \quad (3)$$

-continued
$$v_g(x, y) = \frac{v_b - v_a}{r} x + \frac{v_c - v_a}{s} y + v_a$$

This means that the same functions can be achieved by transmitting ua, va, ub, vb, uc, vc, instead of a0–a5. In the same way, using the horizontal and vertical components (ua,va), (ub,vb), (uc,vc), (ud,vd) of the motion vectors of the four representative points (0,0), (r,0), (0,s), (r,s), equation (2) may be rewritten as:

$$u_g(x, y) = \frac{s-y}{s}\left(\frac{r-x}{r}u_a + \frac{x}{r}u_b\right) + \quad (4)$$
$$\frac{y}{s}\left(\frac{r-x}{r}u_c + \frac{x}{r}u_d\right)$$
$$= \frac{u_a - u_b - u_c + u_d}{rs}xy + \frac{-u_a + u_b}{r}x + \frac{-u_a + u_c}{s}y + u_a$$
$$v_g(x, y) = \frac{v_a - v_b - v_c + v_d}{rs}xy + \frac{-v_a + v_b}{r}x + \frac{-v_a + v_c}{s}y + v_a$$

Therefore, the same functions can be achieved by transmitting ua, va, ub, vb, uc, vc, ud, vd instead of b0–b7. This situation is shown by FIG. 1. If global motion compensation is performed between an original image 102 and a reference image 101 in the current frame, motion vectors 107, 108, 109, 110 of representative points 103, 104, 105, 106 (wherein motion vectors are defined as starting at points in the original image and terminating at corresponding points in the reference image of the current frame), may be transmitted instead of the motion parameters. In this specification, the system using equation (1) is referred to as global motion compensation based on linear interpolation/extrapolation, and the system using equation (2) is referred to as global motion compensation based on bilinear interpolation/extrapolation.

Warping prediction is the application of this global movement compensation processing to a smaller area of the image. An example of warping prediction using bilinear interpolation/extrapolation is shown in FIG. 2. FIG. 2 shows processing to synthesize a predicted image of an original image 202 of a current frame using a reference image 201. First, the original frame image 202 is divided into plural polygon-shaped patches to give a patched image 209. The apex of a patch is referred to as a lattice point, and each lattice point is common to plural patches. For example, a patch 210 comprises lattice points 211, 212, 213, 214, and these lattice points are also the apices of other patches. After dividing the image into plural patches in this way, motion estimation is performed. In the example shown here, motion estimation is performed on lattice points using the reference image 201. As a result, each patch in a reference image 203 obtained after motion estimation is transformed. For example, the patch 210 corresponds to a transformed patch 204. This is because, in motion estimation, it was estimated that the lattice points 205, 206, 207, 208 corresponded to 211, 212, 213, 214.

The motion vectors of the lattice points are thereby found, and an interframe predicted image is synthesized by calculating the motion vector for each pixel in the patch by bilinear interpolation. The processing of this warping prediction is basically the same as the global motion compensation shown in FIG. 1, and the "motion vectors at the corners of the image" are transformed into "motion vectors of the lattice points". If a triangular patch is used instead of a rectangular patch, warping prediction may be realized by linear interpolation/extrapolation.

Examples of encoding and decoding techniques to simplify global motion compensation for representing motion vectors of the whole image using a small number of parameters may be found in the applicant's inventions "Image Encoding and Decoding Methods" (Japanese Unexamined Patent Publication: Application No. Hei 8-60572) and "Methods of Synthesizing Interframe predicted images" (Japanese Unexamined Patent Publication: Application No. Hei 8-249601).

By introducing global motion compensation or warping prediction described above, the motion of the image can be expressed with fewer parameters, and a high data compression rate can be achieved. However, the processing amount in encoding and decoding is greater than in the conventional method. In particular, the divisions of equations (3) and (4) are major factors in making the processing complex. In other words, in global motion compensation or warping prediction, a problem arises in that the processing amount required to synthesize predicted images is large.

SUMMARY OF THE INVENTION

It is therefore an object of this invention to reduce the computing amount by replacing the divisions involved in motion compensation encoding and decoding by a binary shift computation using registers with a small number of bits.

In order to achieve the aforesaid objective, this invention provides an image encoding and decoding method for synthesizing an interframe predicted image by global motion compensation or warping prediction wherein global motion vectors are found by applying a two-stage interpolation/extrapolation to motion vectors of plural representative points having a spatial interval with a characteristic feature. More specifically, this invention provides a method of synthesizing an interframe predicted image wherein, when the motion vector of a pixel is calculated by performing bilinear interpolation/extrapolation on motion vectors of four representative points of an image where the pixel sampling interval in both the horizontal and vertical directions is 1 and the horizontal and vertical coordinates of the sampling points are obtained by adding to integers (where w=wn/wd, wn is a non-negative integer, wd is the hw power of 2, hw is a non-negative integer and wn<wd), there are representative points at coordinates (i,j), (i+p, j), (i, j+q), (i+p, j+q) (where i, j, p, q are integers), the horizontal and vertical components of the motion vectors of representative points take the values of integral multiples of 1/k (where k is the hk power of 2, and hk is a non-negative integer), and when the motion vector of a pixel at the coordinates (x+w, y+w) is found, the horizontal and vertical components of the motion vector at the coordinates (x+w, j) are found by linear interpolation/extrapolation of motion vectors of representative points at coordinates (i, j), (i+p, j), as values which are respectively integral multiples of 1/z (where z is the hz power of 2, and hz is a non-negative integer), and after finding the horizontal and vertical components of the motion vector at the coordinates (x+w, j+q) by linear interpolation/extrapolation of motion vectors of representative points at coordinates (i, j+q), (i+p, j+q), as values which are respectively integral multiples of 1/z (where z is the hz power of 2, and hz is a non-negative integer), the horizontal and vertical components of the motion vector of the pixel at the coordinates (x+w, y+w) are found by linear interpolation/extrapolation of the aforesaid two motion vectors at the coordinates (x+w, j), (x+w, j+q) as values which are respectively integral multiples of 1/m (where m is the hm power of 2, and hm is a non-negative integer).

This invention makes it possible to perform divisions by means of shift computations by appropriately selecting representative point coordinates, and to implement the aforesaid motion compensation scheme using registers having a small number of bits by reducing the number of shift bits in the shift computations.

PREFERRED EMBODIMENTS OF THE INVENTION

This invention is an application of an invention relating to a method of accelerating the computation involved in global motion compensation and warping prediction already proposed by the applicant (Application No. Hei 08-060572 and Application No. Hei 08-249601). This invention will be described in the context of its application to global motion compensation, but it may also be applied to warping prediction wherein identical processing to that of global motion compensation is performed.

In the following description, it will be assumed that the pixel sampling interval is 1 in both the horizontal and vertical directions and a pixel exists at a point where horizontal and vertical coordinate is obtained by adding w (where w=wn/wd, wn is an integer which cannot be negative, wd is a positive integer and wn<wd) to integers w represents the coordinate phase shift the coordinates of a representative point in global motion compensation, and a pixel. Typically it has the values 0, 1/2, 1/4. Further, it will be assumed that the numbers of pixels of the image in the horizontal and vertical directions are respectively r and s (where r and s are positive integers), and image pixels lie in a range such that the horizontal coordinate is from 0 to less than r, and the vertical coordinate is from 0 to less than s.

When motion compensation is performed using linear interpolation/extrapolation (affine transformation) or bilinear interpolation/extrapolation (co-1st order transformation), and quantization is performed on the motion vector of each pixel, mismatches are prevented and computations are simplified (Japanese Unexamined Patent Publication: Application No. Hei 06-193970). Hereafter, it will be assumed that the horizontal component and vertical component of the motion vector of a pixel are integral multiples 1/m (where m is a positive integer). It will moreover be assumed that the global motion compensation used for motion vectors of representative points described in "Background of the Invention" will be performed, and that the motion vectors of representative points are integral multiples of 1/k (where k is a positive integer). In this specification, the term "motion vector of a pixel" implies a motion vector used in order to actually synthesize a predicted image when performing global motion compensation.

On the other hand, the term "motion vector of a representative point" means a parameter used to calculate a motion vector of pixel. Therefore, it may occur that the motion vector of a pixel and the motion vector of a representative point do not coincide even if they are located at the same coordinates due to differences of quantization step size, etc.

Figure 1:
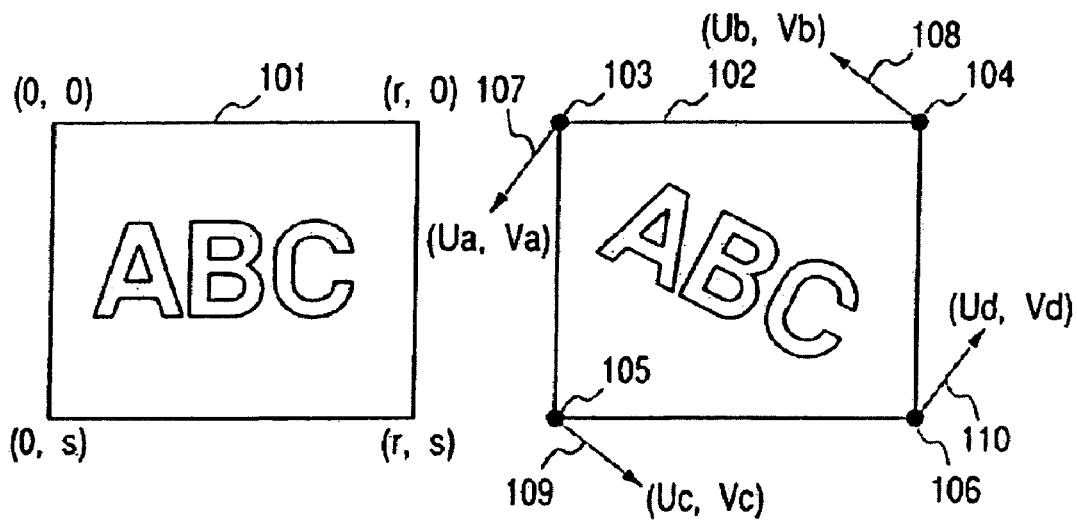
FIG. 1 is a diagram showing an example of global motion compensation for transmitting motion vectors of representative points.
Figure 3:
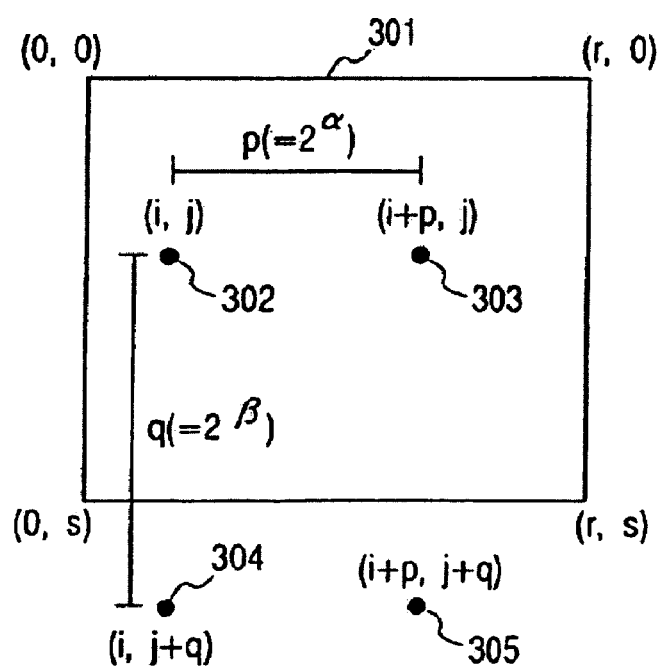
FIG. 3 is a diagram showing an example of the position of representative points for performing high speed processing.
Figure 2:
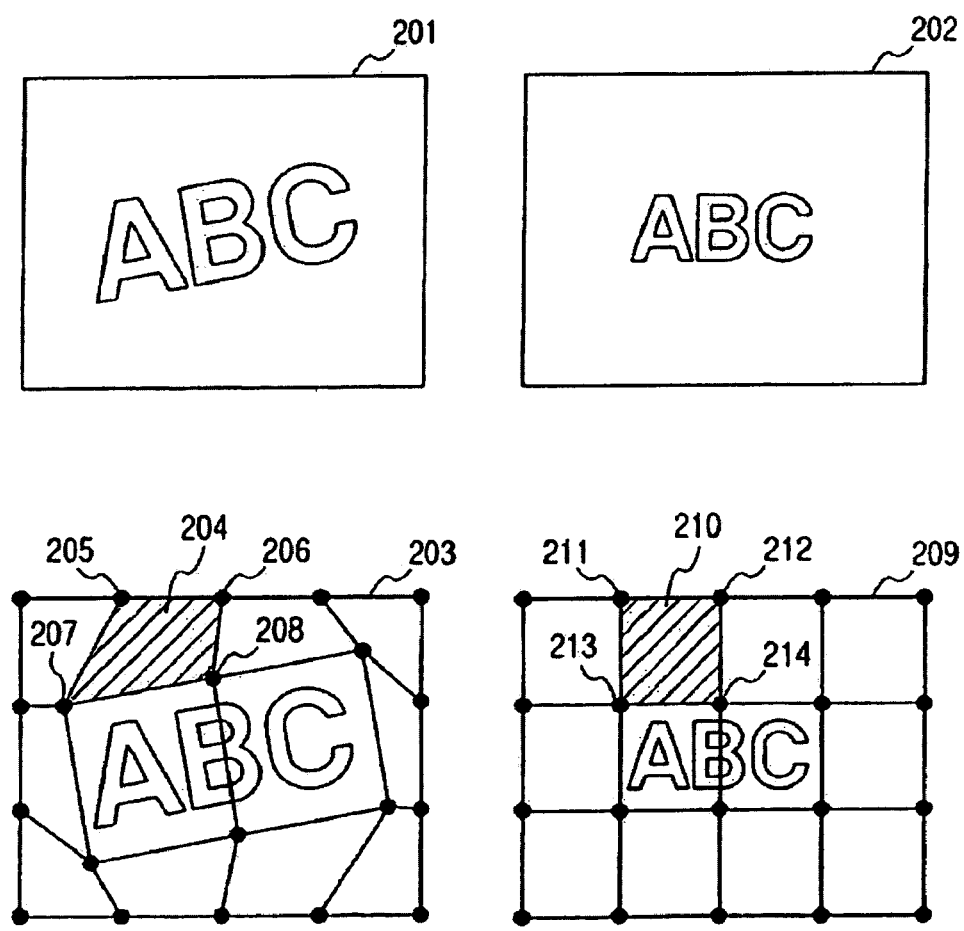
FIG. 2 is a diagram showing an example of warping prediction.

First, global motion compensation using linear interpolation/extrapolation will be described referring to FIG. 3. In this example, instead of taking a representative point situated at the corner 301 of the image, representative points 302, 303, 304, 305 are generalized at (i, j) (i+p, j) (i, j+q) (i+p, j+q) (where i, j, p, q are integers). The points 302, 303, 304, 305 may be situated inside or outside the image. If the horizontal and vertical components of the motion vectors of representative points multiplied by k are respectively (u0, v0), (u1,v1), (u2,v2), (u3,v3) (where u0, v0, u1, v1, u2, v2, u3, v3 are integers), the values obtained by multiplying the horizontal and vertical components of a motion vector of a pixel situated at (x+w, y+w) by m, i.e., (u(x+w, y+w), v(x+w, y+w)), may be expressed by the following equation when $$u(x+w, y+w) = u(x, y) \quad (5)$$
$$= (((j+q-y)((i+p-x)u_0 + (x-i)u_1) +$$
$$(y-j)((i+p-x)u_2 + (x-i)u_3))m) // (pqk)$$
$$v(x+w, y+w) = v(x, y)$$
$$= (((j+q-y)((i+p-x)v_0 + (x-i)v_1) +$$
$$(y-j)((i+p-x)v_2 + (x-i)v_3))m) // (pqk)$$

where x, y, u(x,y), v(x,y) are integers, [//]is a division which rounds up the result of an ordinary computation to the nearest integer when the result is not an integer, and the order of priority as an operator is equivalent to multiplication and division. It is desirable to round off non-integral values to the nearest integer so as to minimize computing errors. In this regard, there are three methods of rounding up the sum of 1/2 and an integer, i.e.:

(1) round the value down to the next lowest integer,
(2) round the value up to the next highest integer,
(3) round the value down when the dividend is negative, and round the value up when the dividend is positive (assuming the divisor is always positive).
(4) round the value up when the dividend is negative, and round the value down when the dividend is positive (assuming the divisor is always positive).

In (3) and (4), the direction of rounding does not change depending on whether the dividend is positive or negative, and these methods therefore offer an advantage from the viewpoint of processing amount to the extent that it is unnecessary to determine positive or negative. High speed processing using (3) can be performed using for example the following equation (6).

$$u(x+w, y+w) = u(x, y) \quad (6)$$
$$= (Lpqk + ((j+q-y)((i+p-x)u_0 +$$
$$(x-i)u_1) + (y-j)((i+p-x)u_2 +$$
$$(x-i)u_3))m + ((pqk)\#2))\#(pqk) - L$$
$$v(x+w, y+w) = v(x, y)$$
$$= (Mpqk + ((j+q-y)((i+p-x)v_0 +$$
$$(x-i)v_1) + (y-j)((i+p-x)v_2 +$$
$$(x-i)v_3))m + ((pqk)\#2))\#(pqk) - M$$

where "#" is an integer division wherein digits after the decimal point are discarded, and the order of priority of computation is assumed to be the same as that of multiplication and division. Generally, this is the type of division that can be realized most easily by a computer. L and M are numbers for ensuring that the dividend is always positive, and are positive integers which are sufficiently large. The term (pqk#2) is used to round off the division result to the nearest integer.

Processing in terms of integers in itself contributes to reducing the amount of processing. However, if p, q, k are respectively set equal to the $\alpha$, $\beta$, hk power of 2 (where $\alpha$, $\beta$, hk are non-negative integers), the calculation of equation (5) can be performed by a shift computation of $\alpha+\beta+hk$ bits, and the amount of processing performed by the computer and special hardware can be largely reduced. If m is set equal to the hm power of 2 (where hm is a non-negative integer, and hm<$\alpha+\beta+$hk, equation (6) may be written as:

$$u(x+w, y+w) = u(x, y) \quad (7)$$
$$= ((2L+1)\langle\langle(\alpha+\beta+h_k-h_m-1) +$$
$$(j+q-y)((i+p-x)u_0 + (x-i)u_1) +$$
$$(y-j)((i+p-x)u_2 +$$
$$(x-i)u_3)\rangle\rangle\rangle(\alpha+\beta+h_k-h_m) - L$$
$$v(x+w, y+w) = v(x, y)$$
$$= ((2M+1)\langle\langle(\alpha+\beta+h_k-h_m-1) +$$
$$(j+q-y)((i+p-x)v_0 + (x-i)v_1) +$$
$$(y-j)((i+p-x)v_2 +$$
$$(x-i)v_3)\rangle\rangle\rangle(\alpha+\beta+h_k-h_m) - M$$

((x<α) means that x is shifted by α bits to the left, and 0 is set in the lower α bits. (x>>α) means that x is shifted by α bits to the right, and 0 is set in the upper α bits. The order of priority of these operators is intermediate between addition/subtraction and multiplication/division). Therefore the number of shift bits may be written as α+β+hk−hm.

When w is not 0, according to the definition w=wn/wd, equation (5) may be rewritten by the following equation (8):

$$u(x+w, y+w) = u\left(x + \frac{w_d}{w_n}, y + \frac{w_d}{w_n}\right) \quad (8)$$
$$= (((w_d j + w_d q - w_d y - wn)((w_d i + w_d p - w_d x - w_n)u_0 + (w_d x + w_n - w_d i)u_1) +$$
$$(w_d y + w_n - w_d j)((w_d i + w_d p - w_d x - w_n)u_2 +$$
$$(w_d x + w_n - w_d i)u_3))m) // (w_d^2 pqk)$$

$$v(x+w, y+w) = v\left(x + \frac{w_d}{w_n}, y + \frac{w_d}{w_n}\right)$$
$$= (((w_d j + w_d q - w_d y - w_n)((w_d i + w_d p - w_d x - w_n)v_0 + (w_d x + w_n - w_d i)v_1) + (w_d y + w_n - w_d j)((w_d i + w_d p - w_d x - w_n)v_2 +$$
$$(w_d x + w_n - w_d i)v_3))m) // (w_d^2 pqk)$$

If wd is the hw power of 2 and hw is a non-negative integer, the division by (p.q.k.wd.wd) becomes a shift computation of α+β+hk+2hw bits, and the division may therefore be replaced by a shift computation as in the case of w=0. Also as in the case of equation (7), if hm<α+β+hk+2hw, the number of shift bits can be reduced to α+β+hk+2hw−hm bits by dividing both the numerator and denominator by m. Therefore, provided that wd is a hw power of 2, the processing when w=0 and when w≠0 is basically the same. Hereafter, although the equations are somewhat complex, the case w≠0 will be described. To find the calculation results for w=0, the substitutions wn=0, wd=1, hw=0 may be made.

To obtain the same global motion compensation predicted image on the transmitting and receiving sides, information about motion vectors of representative points must be transmitted to the receiving side in some form or other. In one method, the motion vectors of representative points are transmitted without modification, and in another method, the motion vectors of the corners of the image are transmitted and the motion vectors of representative points are calculated from these values. Hereafter, the latter method is described.

Assume that the motion vectors of the four corners (−c, −c), (r−c, −c) (−c, s−c), (r−c, s−c) of the image can be only integral multiples of 1/n (where n is a positive integer, c=cn/cd, cn is a non-negative integer, cd is a positive integer and cn<cd), and that (u00, v00), (u01, v01), (u02, v02), (u03, v03) which are the horizontal and vertical components of these vectors multiplied by n, are transmitted as global motion parameters. c represents a phase shift between the corners and representative points, and it typically has a value of 0, 1/2 or 1/4. (u0, v0), (u1, v1), (u2, v2), and (u3, v3) which are the horizontal and vertical components of the motion vectors respectively at the points (i, j), (i+p, j), (i, j+q), and (i+p, j+q) multiplied by k, may be defined as:

$$u_0 = u'(i,j)$$
$$v_0 = v'(i,j)$$
$$u_1 = u'(i+p,j)$$
$$v_1 = v'(i+p,j)$$
$$u_1 = u'(i,j+q)$$
$$v_2 = v'(i,j+q)$$
$$u_3 = u'(i+p,j+q)$$
$$v_3 = v'(i+p,j+q) \quad (9)$$

where u'(x, y), v'(x, y) are defined by transforming equation (5):

$$u'(x,y) = (((c_d s - c_n - c_d y)((c_d r - c_n - c_d x)u_{00} + (c_d x + c_n)u_{01}) + (c_d y + c_n)((c_d r - c_n - c_d x)u_{02} + (c_d x + c_n)u_{03}))k) // (c_d^2 rsn)$$

$$v'(x,y) = (((c_d s - c_n - c_d y)((c_d r - c_n - c_d x)v_{00} + (c_d x + c_n)v_{01}) + (c_d y + c_n)((c_d r - c_n - c_d x)v_{02} + (c_d x + c_n)v_{03}))k) // (c_d^2 rsn) \quad (10)$$

[///] is a division wherein the computation result is rounded to the nearest integer when the result of an ordinary division is not an integer, and the order of priority is equivalent to multiplication and division. In this way, if (u0, v0), (u1, v1), (u2, v2), and (u3, v3) are calculated and global motion compensation is performed at the representative points (i, j), (i+p, j), (i, j+q), and (i+p, j+q), global motion compensation at the representative points (−c, −c), (r−c, −c) (−c, s−c), and (r−c, s−c) can be approximated. As described hereabove, if p and q are non-negative integral powers of 2, the processing can be simplified. In general, it is preferable not to perform extrapolation when calculating motion vectors of pixels in the image by equation (5). This is to avoid increase of quantization error in motion vectors of representative points due to extrapolation. For this reason, it is desirable that all the representative points are in such positions that they surround the pixels in the image. Hence when i=j=c=0, it is appropriate that p and q are effectively the same as, or have slightly larger values than, r and s. Care must however be exercised as if the values of p and q are too large, the number of bits required for the calculation increases.

To reduce computational error in the processing of equations (9) and (10), it is preferable that [///] rounds off non-integral values to the nearest integer. In this regard, the sum of 1/2 and an integer may be rounded off to the nearest integer by any of the aforesaid methods (1)–(4). However compared to the case of equation (5) (calculation performed for each pixel), equation (14) requires fewer computations (only four calculations for one image), so even when the methods of equations (1) or (2) are chosen, there is not much effect on the total computational amount.

If the values of p and q are set to non-negative integral powers of 2 as described in the above examples, the synthesis of interframe predicted images in global motion compensation is greatly simplified. However, there is still one other problem. Considering for example the case p=512, q=512, k=32, m=16, wd=2, wn=1 (w=0.5), which are typical parameters in image coding, we have α+β+hk+2hw−hm=21. This means that when u(x+w, y+w) is a value requiring 12 or more bits in binary form, a register of at least 33 bits is required to perform the high speed computation of equation (8). When for example m=16, the value of u(x+w, y+w) is obtained by multiplying the horizontal component of the real motion vector by 16, so this could well be a value requiring 12 or more bits in binary form. At the present time, few processors have registers capable of storing integers of 33 or more bits, and they are expected to remain costly in future. Moreover in general, if the processor circuit is large, power consumption is correspondingly greater, so an algorithm requiring a large register is also disadvantageous from the viewpoint of power consumption. Therefore it is desirable that even when the division can be replaced by a shift computation, the number of shift bits is as small as possible.

To resolve this problem, the two-step algorithm according to this invention which is described below may be used. Prior to calculating the motion vector of the pixel at the point (x+w, y+w) using the motion vectors of the representative points (i, j), (i+p, j), (i, j+q), (i+p, j+q), motion vectors at provisional representative points (i, y+w) and (i+p, y+w) are calculated so that the horizontal and vertical components are integral multiples of 1/z (where z is a positive integer). As in the aforesaid example, the horizontal and vertical components of the motion vectors of the representative points (i, j), (i+p, j), (i, j+q), (i+p, j+q) multiplied by k are taken to be respectively (u0, v0), (u1, v1), (u2, v2), (u3, v3) (where u0, v0, u1, v1, u2, v2, u3, v3 are integers). If the provisional representative points are situated at (i, y+w) and (i+p, y+w), (uL(y+w), vL(y+w)) and (uR(y+w), vR(y+w)) which are the horizontal and vertical components of the motion vectors of these provisional representative points multiplied by z, are defined as follows:

$$u_L(y+w) = (((w_d j + w_d q - w_d y - w_n)u_0 + (w_d y + w_n - w_d j)u_2)z) ~/\!/~/\!/~(w_d q k) \quad (11)$$

$$v_L(y+w) = (((w_d j + w_d q - w_d y - w_n)v_0 + (w_d y + w_n - w_d j)v_2)z) ~/\!/~/\!/~(w_d q k)$$

$$u_R(y+w) = (((w_d j + w_d q - w_d y - w_n)u_1 + (w_d y + w_n - w_d j)u_3)z) ~/\!/~/\!/~(w_d q k)$$

$$v_R(y+w) = (((w_d j + w_d q - w_d y - w_n)v_1 + (w_d y + w_n - w_d j)v_3)z) ~/\!/~/\!/~(w_d q k)$$

[/////] is a division which rounds up the result of an ordinary computation to the nearest integer when the result is not an integer, and the order of priority is equivalent to multiplication and division. (The required function for [/////] is the same as the [////] described above). As (i, y+w) lies on a line joining (i, j) and (i, j+q), (uL(y+w), vL(y+w)) can easily be found by a first order linear intrapolation/extrapolation using (u0, v0) and (u2, v2). Likewise, as (i+p, y+w) lies on a line joining (i+p, j) and (i+p, j+q) may also be found by a first order linear interpolation/extrapolation.

By performing another first order linear interpolation/extrapolation on the motion vectors (uL(y+w), vL(y+w)) and (uR(y+w), vR(y+w)) of the provisional representative points found as described above, (u(x+w, y+w), v(x+w, y+w)) which are the horizontal and vertical components of the motion vector of the pixel at (x+w, y+w)) multiplexed by m, are found. This processing is performed by the following equation:

$$u(x+w,y+w)=(((w_d i+w_d p-w_d x-w_n)u_L(y+w)+ (w_d x+w_n-w_d i)u_R(y+w))m)/\!/(w_d pz)$$

$$v(x+w,y+w)=(((w_d i+w_d p-w_d x-w_n)v_L(y+w)+ (w_d x+w_n-w_d i)v_R(y+W))m)/\!/(w_d pz) \quad (12)$$

In the same way as described above, if p is the α power of 2, m is the hm power of 2, z is the hz power of 2, wd is the hw power of 2 (where α, hm, hz, ws are non-negative integers), the division by p.z.wd in equation (12) may be replaced by α+hz+hwhm bit right shift (where hm<α+hz+hw). Also, if z=16 (hz=4), and the typical parameters p=512, q=512, k=32, m=16, wd=2, wn=1 (w=0.5) are used, the number of shift bits is 10, so the number of bits required for the register used in the computation can be largely reduced. It may be noted that in the above example, a motion vector is found by performing a first order linear interpolation/extrapolation in the vertical direction on the motion vector of a representative point, and the motion vector of a pixel is then found by performing a first order linear interpolation/extrapolation in the horizontal direction on the motion vector of this representative point. Conversely, the same result may be obtained by performing a first order linear interpolation/extrapolation in the horizontal direction when the motion vector of a representative point is found, and in the vertical direction when the motion vector of a pixel is found.

In this scheme, the two steps of equations (11) and (12) are required to find a motion vector of a pixel, and at first sight it might appear that this would lead to an increase of computation amount. However if the motion vector of a provisional representative point is first found, this may be used for all r pixels on a line having the vertical coordinate y+w, so the percentage of the total processing amount due to equation (11) is very small. Therefore, the advantage (i.e. a smaller number of registers) gained by the lesser number of bits outweighs the disadvantage of increased computation amount due to having to perform the calculation of equation (11).

After obtaining the values (u(x+w, y+w), v(x+w, y+w)), (u(x+w, y+w), v(x+w, y+w)) may be divided into integral parts (uI(x+w, y+w), vI(x+w, y+w)) and fractional parts (uF(x+w, y+w), vF(x+w, y+w)) by the following processing.

$$u_1(x+w, y+w)=((Lm+u(x+w, y+w))>>h_m)-L$$

$$v_1(x+w,y+w)=((Mm+v(x+w,y+w))>>h_m)-M \quad (13)$$

$$u_F(x+w,y+w)=u(x+w,y+w)-u_1(x+w,y+w)m$$

$$v_F(x+w,y+w)=v(x+w,y+w)-v_1(x+w,y+w)m \quad (14)$$

where uI(x+w, y+w), vI(x+w, y+w) are integers expressing the integral parts of a motion vector of a pixel. uF(x+w, y+w), vF(x+w, y+w) are integers both having values from 0 to less than m expressing m times the fractional parts of a motion vector of a pixel. As in the above example, m is the hm power of 2 (where hm is a non-negative integer), and L and M are sufficiently large to make the shift values non-negative.

When bilinear order interpolation is used as a method of interpolating luminance value, the luminance value of a pixel in the interframe predicted image can also be found by the following processing. When x'=x+w+uI(x+w, y+w), y'=y+w+vI(x+w, y+w), if the luminance values of pixels at (x', y'), (x'+1, y'), (x', y'+1), (x'+1, y'+1) in the reference image are Ya, Yb, Yc, Yd, the luminance value Y (x+w, y+w) of a pixel at the point (x+w, y+w) in the interframe predicted image may be found by:

$$Y(x+w,y+w)=((m-v_F)((m-u_F)Y_a+u_F Y_b)+v_F((m-u_F)Y_c+ u_F Y_d)+(m^2 1)\!\rangle])\!\rangle(2h_m) \quad (15)$$

where uF, vF are respectively abbreviations for uF(x+w, y+w), vF(x+w, y+w).

In equations (12) and (13), α+hz+hw-hm bit and hm bit right shifts are respectively performed. This means that if an ($\alpha$+hz+hw-hm)+hm=$\alpha$+hz+hw bit right shift is performed in the calculation of equation (10), uI(x+w, y+w) and vI(x+w, y+w) can be calculated in one step. It is convenient if a+hz+hw is an integral multiple of 8 because, in general, the size of a processor register is a multiple of 8 bit units. Frequently, two 0.8 bit registers (an upper bit register and a lower bit register) are linked to make a 16 bit register, or four 8 bit registers or two 16 bit registers are linked to make a 32 bit register. If the values of uI(x+w, y+w), and vI(x+w, y+w) have already been calculated by, for example, a 16 bit shift computation, there is then no need to perform another shift computation. In other words, if the value prior to shift is stored in a 32 bit register, and the upper 16 bits are used as a separate register, the values of uI(x+w, y+w) or vI(x+w, y+w) are stored in this 16 bit register.

It will be appreciated that making the number of shift bits an integral multiple of 8 facilitates not only the processing of equation (10) but all aspects of the shift computation. It is particularly important to make processing easier when a large number of shift computations has to be performed (e.g. a shift computation for each pixel). Also, by first adding the same number of left shifts as the number of bits to the numerator and denominator, the number of right shifts due to division can be increased even when the number of shift bits is not an integral multiple of 8. For example, when a computation is performed by a 6 bit right shift, the same computation can be performed by an 8 bit right shift by first multiplying the value to which the shift operation is applied by 4 (this is equivalent to performing a 2 bit left shift). (Taking equation (5) which concerns u(x+w, y+w) as an example, this processing can be implemented by first multiplying u0, u1, u2, u3 by 4). Care must however be taken when performing this processing that overflow of the value to be shifted does not occur.

Many image encoders and decoders are able to adapt to a plurality of image sizes. In this case, when for example global motion compensation is performed using equations (12), (13), (14), the number of shift bits changes according to change of image size and can no longer be fixed to integral multiples of 8. This can be treated as follows. For example, consider the situation where an $\alpha$+hz+hw bit right shift is required to calculate uI(x+w, y+w) and vI(x+w, y+w) as described above, where a can have a value in the range 7–11. If hz=5, hw=1 when $\alpha$ is less than 10, and hz=4, hw=1 when $\alpha$=11, the number of shift bits can be arranged to be always 16 or less. As stated hereintofore, when the number of shift bits is less than 16, it can be simulated to be 16 by first multiplying the value to be shifted by a constant. Hence, when the image size changes, the number of shift bits can be controlled to a convenient number by varying other parameters (e.g. quantization step size of motion vectors) accordingly. Care must be taken however not to make the quantization step size of the motion vectors so large that it causes an appreciable degradation of the decoded image.

When the algorithm shown in this specification is applied to ordinary global motion compensation, the motion vector of a representative point is first found to a precision of 1/k pixels using the motion vectors of the corners of the image which have a precision of 1/n pixels. Next, the motion vector of a provisional representative point is found to a precision of 1/z pixels using the motion vector of the representative point, and the motion vector of a pixel is found to a precision of 1/m pixels using the motion vector of this provisional representative point. When the motion vectors of the corners of the image are transmitted as a motion parameter, it is desirable to make k as large a value as possible in order to closely approximate bilinear interpolation/extrapolation by this parameter. However, the horizontal and vertical components of the motion vector of the representative point includes an error having an absolute value equal to or less than 1/(2k) due to the effect of quantization. From the viewpoint of making the approximation more accurate, it is preferable to increase the precision of the motion vector also of the provisional representative point, however since the motion vector of the provisional representative point is found using the motion vector of the representative point, there is no advantage to be gained in calculating it with an accuracy greater than that of the motion vector of the representative point. Therefore, it is preferable that z$\leq$k in order to suppress the number of bits required for the computation, and that m$\leq$z for the same reason.

The above discussion has considered global motion compensation using bilinear interpolation/extrapolation, but the number of shift bits can be suppressed by introducing the same processing in the case of linear interpolation/extrapolation. For example, assume that the horizontal and vertical components of the motion vectors of representative points at (i, j), (i+p, j), and (i, j+q) (where i, j, p, q are integers) multiplied by k, are (u0, v0), (u1, v1), and (u2, v2) (where u0, v0, u1, v1, u2, v2 are integers). The horizontal and vertical components of the motion vectors of a pixel (x+w, y+w) multiplied by m, i.e. (u(x+w, y+w), v(x+w, y+w)), can then be expressed as follows (where x, y, u(x+w, y+w), v(x+w, y+w) are integers and the definition of w is the same as above).

$$u(x+w,y+w)=(((u_1-u_0)(w_dx+w_n-w_di)q+ \\ (u_2-u_0)(w_dy+W_n-w_di)p+u_0w_dpq)n)//(w_dpqk)$$

$$v(x+w,y+w)=(((v_1-v_0)(w_dx+w_n-w_di)q+ \\ (v_2-v_0)(w_dy+w_n-w_di)p+v_0w_dpq)m)//(w_dpqk) \quad (16)$$

In this case also, p, q, k, m, wd are respectively $\alpha$, $\beta$, hk, hm and hw powers of 2 (where $\alpha\geq\beta$, hk, hm and hw are non-negative integers), and if $\alpha\geq\beta$, this equation may be rewritten as:

$$u+(x+x,y+x)=(((u_1-u_0)(w_dx+w_n-w_di)2^{\alpha-\beta}+ \\ (u_2-u_0)(w_dy+w_n-w_di)+u_0w_dp)m)//(w_dpk)$$

$$v(x+w,y+w)=(((v_1-v_0)(w_dx+w_n-w_di)2^{\alpha-\beta}+ \\ (v_2-v_0)(w_dy+w_n-w_di)+v_0w_dp)m)//(w_dpk) \quad (17)$$

As in the case when bilinear interpolation/extrapolation is used, the integer part of the motion vector of the pixel at (x+w, y+w) can be found by an $\alpha$+hk+hw bit right shift, therefore if $\alpha$+hk+hw is arranged to be an integral multiple of 8, processing can be simplified for the same reason as given above. It should be noted that when $\alpha<\beta$, the number of shift bits is $\beta$+hk+hw.

The construction of the image encoding device and decoding device for performing image encoding and decoding according to this invention which uses the synthesis of interframe predicted images, will now be described.

Figure 6:
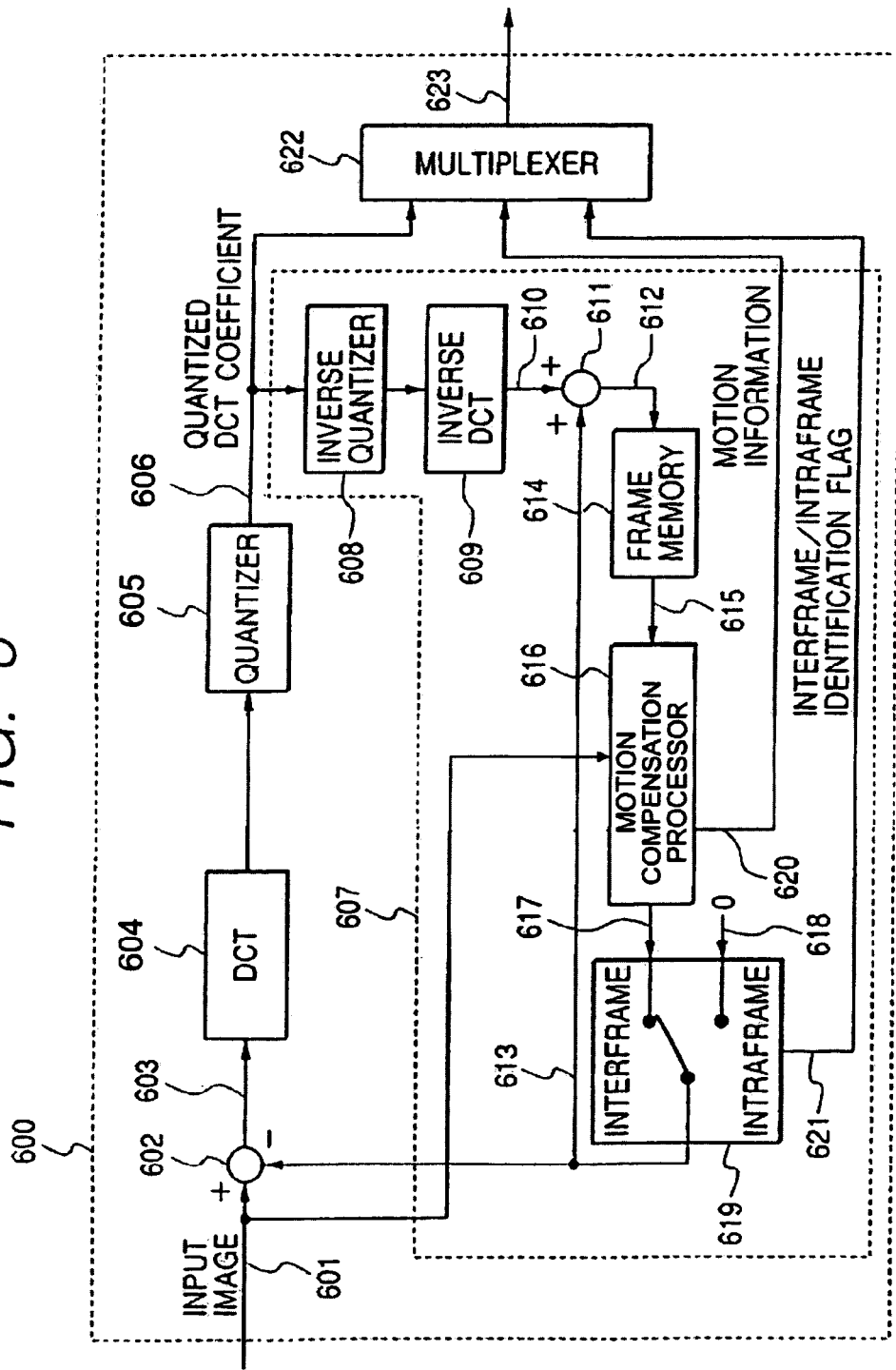
FIG. 6 is a diagram showing a typical construction of an image encoding device according to this invention.

FIG. 6 shows the configuration of one embodiment of an image encoding device 600 according to this invention.

The construction shown in the diagram is essentially the same as in the prior art encoding device excepting for the motion compensation processor 616.

A subtractor 602 calculates a difference between an input frame (original image of a current frame which is to be encoded) 601 and an output image 613 (interframe predicted image) of an interframe/intraframe coding changeover switch 619, and outputs a differential image 603. This differential image is quantized by a quantizer 605 after converting to DCT coefficients by a DCT converter 604 so as to give quantized DCT coefficients 606. These quantized DCT coefficients are output as transmission information to a transmission path, and are also used to synthesize an interframe predicted image in the encoder.

The procedure for synthesizing the frame predicted image will now be described.

The quantized DCT coefficients 606 pass through an inverse quantizer 608 and inverse DCT converter 609 so as to give a decoded differential image 610 (same image as the differential image reproduced on the receiving side). The output image 613 of the interframe/intraframe coding changeover switch 619 (described later) is added to this in an adder 611, and a decode imaged 612 of the current frame (same image as the decoded image of the current frame reproduced on the receiving side) is thus obtained. This image is first stored in a frame memory 614, and is delayed by the time for one frame. At this time, therefore, the frame memory 614 outputs a decoded image 615 of the immediately preceding frame. The decoded image of the immediately preceding frame and input image 601 of the current frame are input to a motion compensation processor 616, and the motion compensation processor 616 synthesizes the aforesaid interframe predicted image. The configuration of this point will be described later.

A predicted image 617 is input to the interframe/intraframe coding changeover switch 619 together with a "0" signal 618. This switch changes over between interframe coding and intraframe coding by selecting either of these inputs.

When the predicted image 617 is selected (FIG. 6 shows this case), interframe coding is performed. On the other hand, when a "0" signal is input, the input image is DCT encoded as it is and output to the transmission path, so intraframe coding is performed.

To obtain a correctly decoded image on the receiving side, it is necessary to know whether interframe coding or intraframe coding was performed on the transmitting side. For this purpose, an identifying flag 621 is output to the transmission path. Finally, an H.261 encoded bit stream 623 is obtained by multiplexing the quantized DCT coefficients, motion vectors and identifying flag information in a multiplexing unit 622.

Figure 7:
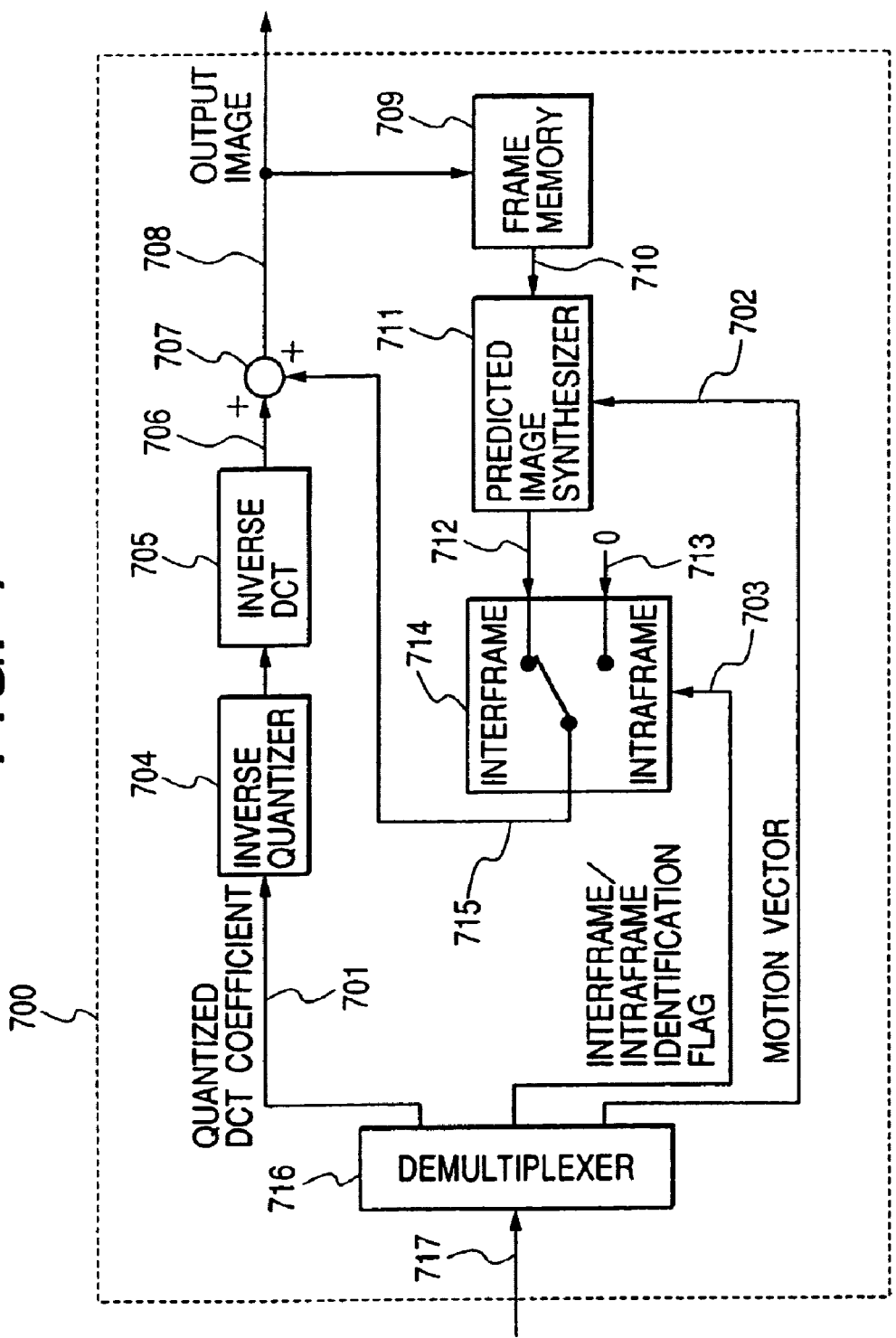
FIG. 7 is a diagram showing a typical construction of the image encoding device according to this invention.

FIG. 7 shows a typical construction of a decoder 700 for receiving the encoded bit stream output by the encoder of FIG. 6.

A bit stream 717 which is received is split into quantized DCT coefficients 701, motion vectors 702 and intraframe/interframe identifying flag 703 by a demultiplexer 716.

The quantized DCT coefficients 701 pass through an inverse quantizer 704 and inverse DCT converter 705 so as to give a differential image 706. This differential image is added to an output image 715 of an interframe/intraframe coding changeover switch 714 in an adder 707, and the result is then output as a decoded image 708. The interframe/intraframe coding changeover switch changes over the output depending on the interframe/intraframe coding identifying flag 703. The predicted image 712 used when interframe coding is performed is synthesized in a predicted image synthesizer 711. Here, positions are shifted according to the received motion vectors 702 relative to the decoded image 710 of the immediately preceding frame stored in a frame memory 709. In the case of intraframe coding, the interframe/intraframe coding changeover switch merely outputs a "0" signal 713.

Figure 8:
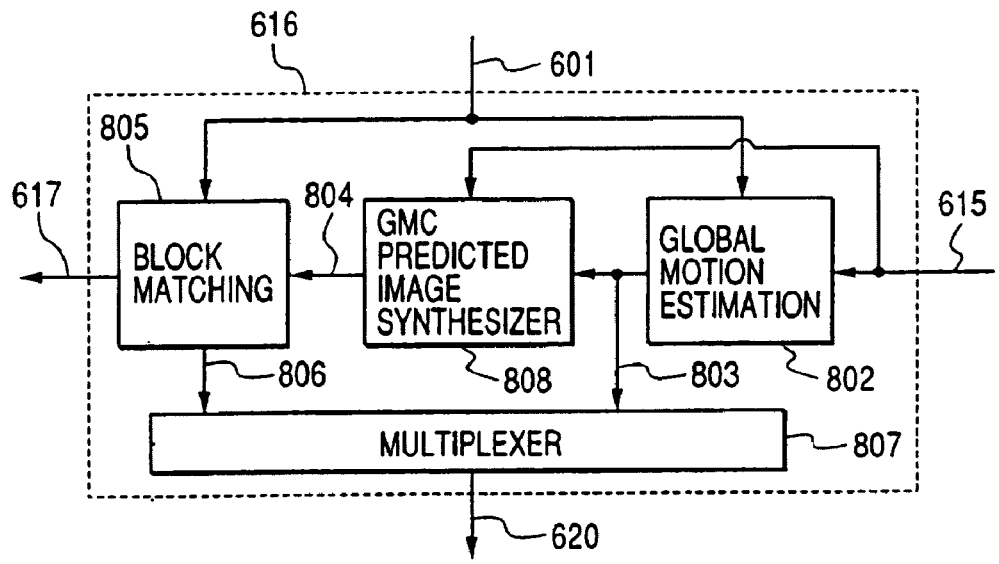
FIG. 8 is a diagram showing a typical construction of a motion compensation processor 616 of FIG. 6.

FIG. 8 shows a typical construction of the motion compensation processor 616 of the image encoding device which uses a global motion compensation scheme based on linear interpolation/extrapolation for transmitting motion vectors of representative points. Numbers which are the same as those of FIG. 6 denote the same components. Motion estimation relating to global motion compensation is performed between the decoded image 615 of the immediately preceding frame and the original image 601 of the current frame by the global motion estimating unit 802, and global motion compensation parameters (for example, values of the aforesaid ua, va, ub, vb, uc, vc, ud, vd) are estimated. Information 803 about these values is transmitted as part of motion information 620. A global motion compensation predicted image 804 is synthesized by a global motion compensation predicted image synthesizer 808 using equation (3), and is supplied to a block matching unit 805. Here, motion compensation (motion estimation and predicted image synthesis) by block matching is performed between the global motion compensation predicted image and original image of the current frame, and block motion vector information 806 and a final predicted image 617 are thereby obtained. This motion vector information is multiplexed with motion parameter information in a multiplexer 807, and output as the motion information 620.

Figure 10:
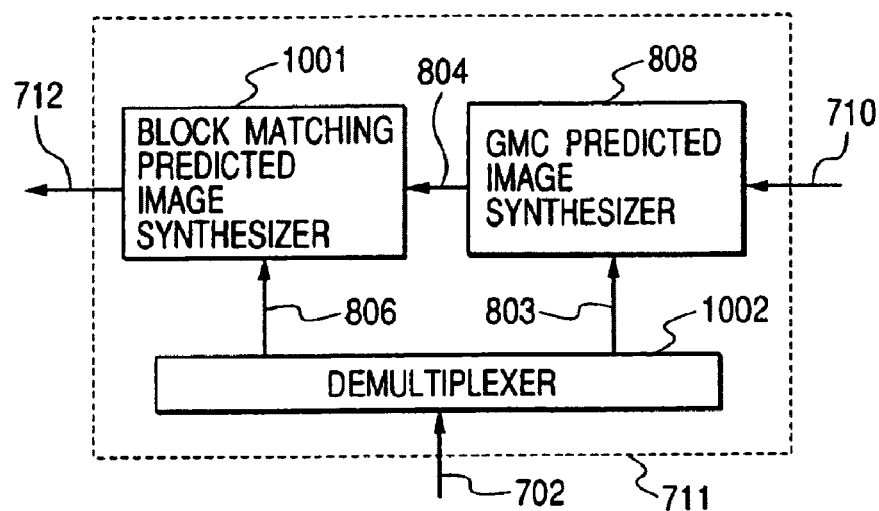
FIG. 10 is a diagram showing a typical construction of a predicted image synthesizer 711 of FIG. 7.

FIG. 10 shows a typical construction of the predicted image synthesizer 711 of FIG. 7. Numbers which are the same as those of other diagrams denote the same components. A global motion compensation predicted image 804 is synthesized in the global motion compensation predicted image synthesizer 808 using the global motion compensation parameters 803 extracted from the motion information 702 in a splitting unit 1002, relative to the decoded image 710 of the immediately preceding frame. The image 804 is supplied to a block matching predicted image synthesizer 1001, and the final predicted image 712 is synthesized using the block matching motion vector information 806 extracted from the motion information 702.

Figure 9:
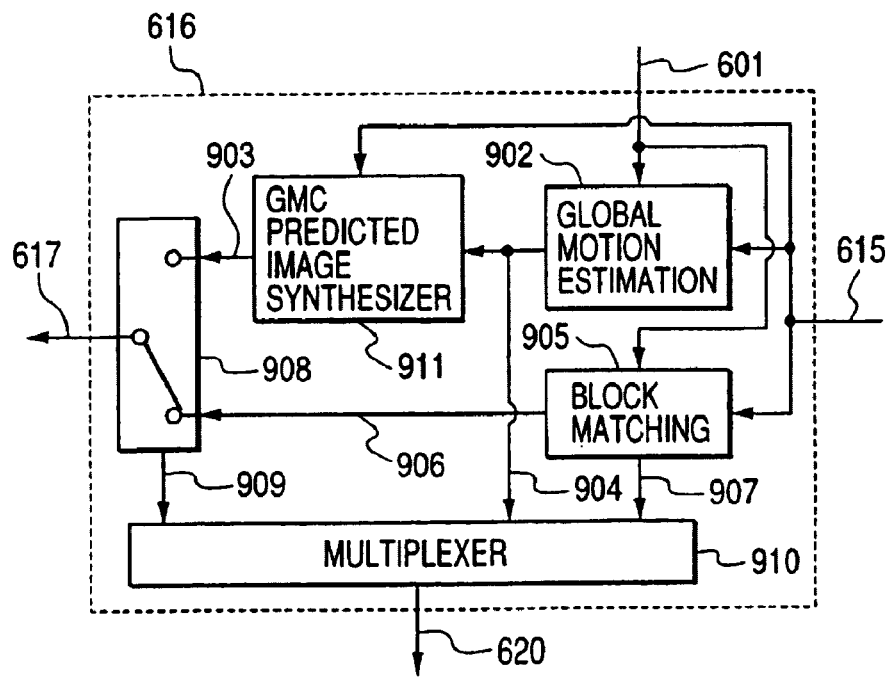
FIG. 9 is a diagram showing another typical construction of the motion compensation processor 616 of FIG. 6.

FIG. 9 shows another typical construction of the motion compensation processor 616. Numbers which are the same as those of FIG. 6 denote the same components. In this example, global motion compensation or block matching is applied to each block. Motion compensation is performed between the decoded image 615 of the immediately preceding frame and the original image 601 of the current frame, respectively by global motion compensation in a global motion estimating unit 902 and global motion compensation predicted image synthesizer 911, and by block matching in a block matching unit 905. A selection switch 908 selects the most suitable scheme for every block between a predicted image 903 due to global motion compensation and a predicted image 906 due to block matching. Global motion compensation parameters 904, motion vectors 907 for each block and selection information 909 relating to global motion compensation/block matching are multiplexed by a multiplexer 910, and the result is output as the motion information 620.

Figure 11:
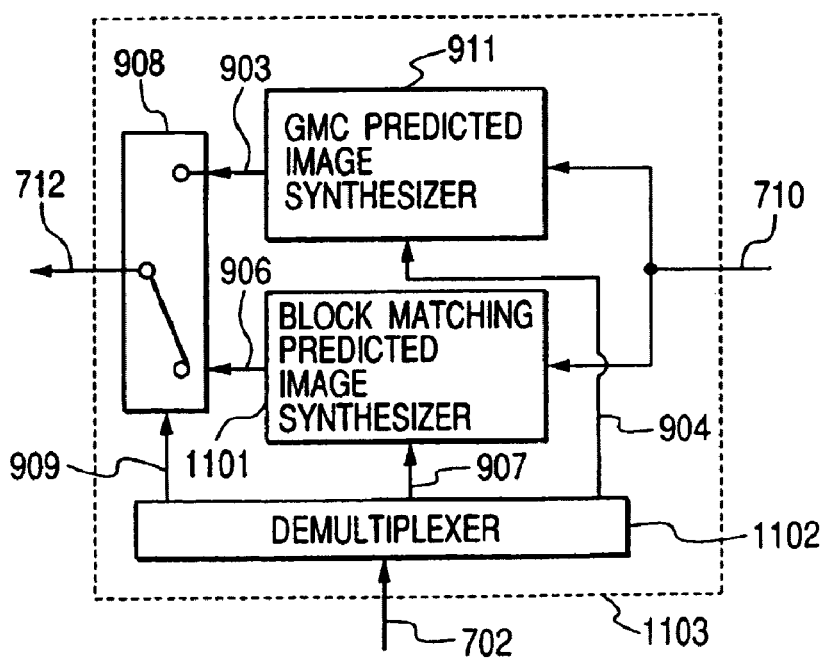
FIG. 11 is a diagram showing a typical construction of a predicted image synthesizer 1103 of FIG. 9.

FIG. 11 shows a typical construction of a predicted image synthesizer 1103 of a decoder which decodes the bit stream generated by an image encoding device using a motion compensation processor 616. Numbers which are the same as those of other diagrams denote the same components. The global motion compensation predicted image 903 is synthesized in the global motion compensation predicted image synthesizer 911 using global motion compensation parameters 904 extracted from the motion information 702 in the splitting unit 1102, relative to the decoded image 710 of the immediately preceding frame. The block matching predicted image 906 is synthesized in the block matching predicted image synthesizer 1101 using block matching motion vector information 907 extracted from the motion information 702 relative to the decoded image 710 of the immediately preceding frame. A selection switch 908 selects either of these schemes for each block, i.e., the predicted image 903 due to global motion compensation or the predicted image 906 due to block matching, based on the selection information 909 extracted from the motion information 702. After this selection process is applied to each block, the final predicted image 712 is synthesized.

Figure 12:
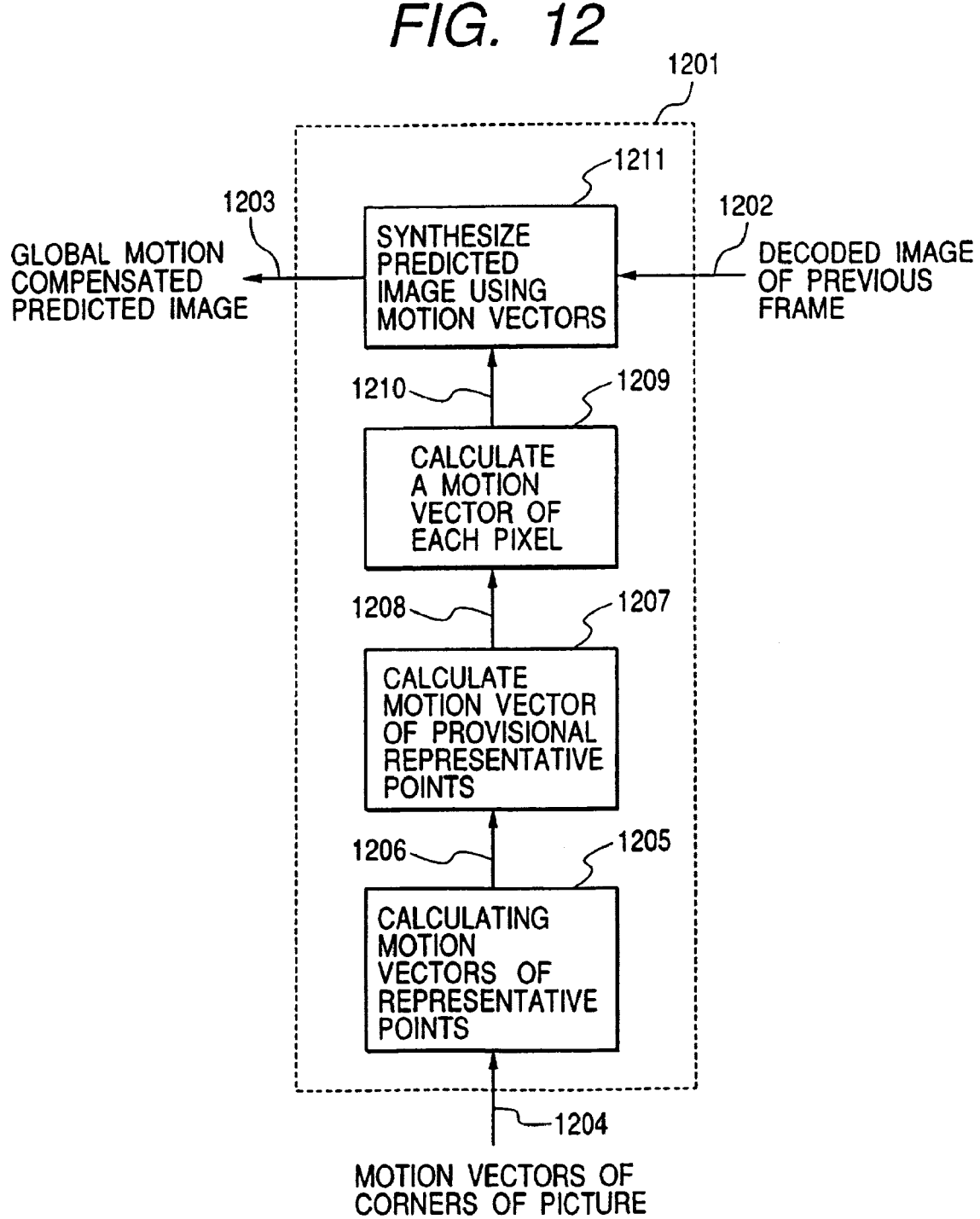
FIG. 12 is a diagram showing a typical construction of a global motion compensation predicted image synthesizer.

FIG. 12 shows the structural configuration of the global motion compensation predicted image synthesizer 1201 according to this invention. It will be assumed that the motion vectors of the corners of the compensation image are transmitted as global motion parameters. The motion vectors of representative points are calculated by equations (9), (10) in a computing unit 1205 using information 1204 relating to motion vectors of the corners of the image. Using information 1206 relating to the motion vectors of these representative points, the motion vectors of provisional representative points are calculated for each line using equation (11) in a computing unit 1207. Then, by using information 1208 relating to the motion vectors of these provisional representative points, motion vectors for each pixel are calculated from equation (12) in a computing unit 1209. At the same time, using information 1210 relating to the motion vectors of each pixel and the decoded image 1202 of the immediately preceding frame, a global motion compensation predicted image 1203 is synthesized and output by a processing unit 1211.

In addition to a conventional image encoder or image decoder using a special circuit or chip, this invention may also be applied to a software image encoder or software image decoder using a universal processor.

Figure 4:
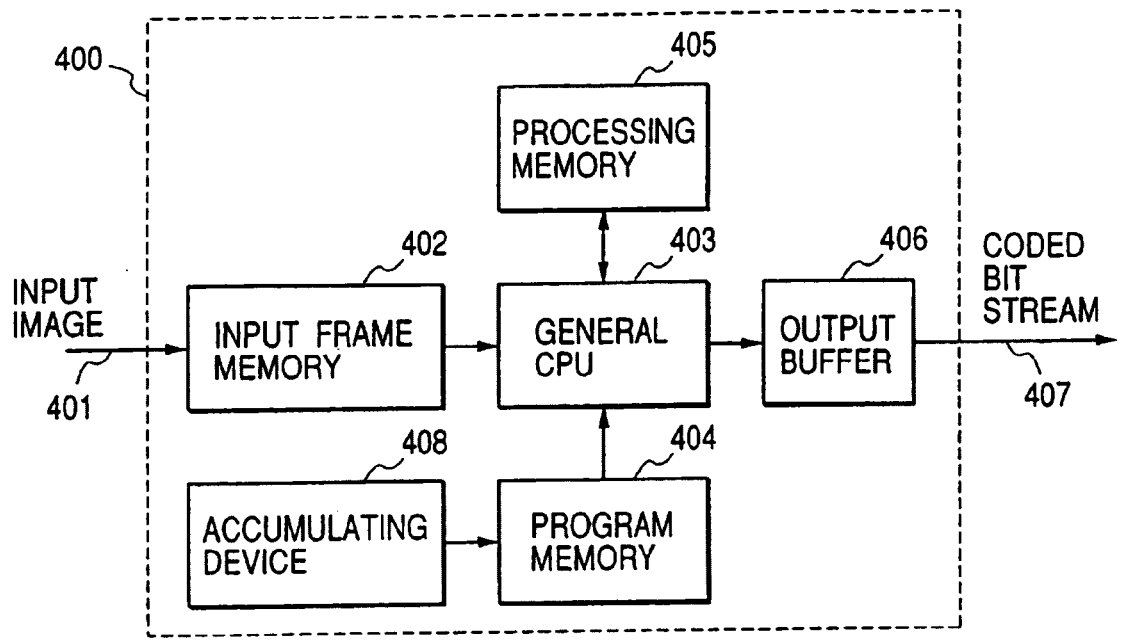
FIG. 4 is a diagram showing a typical construction of a software image encoding device.
Figure 5:
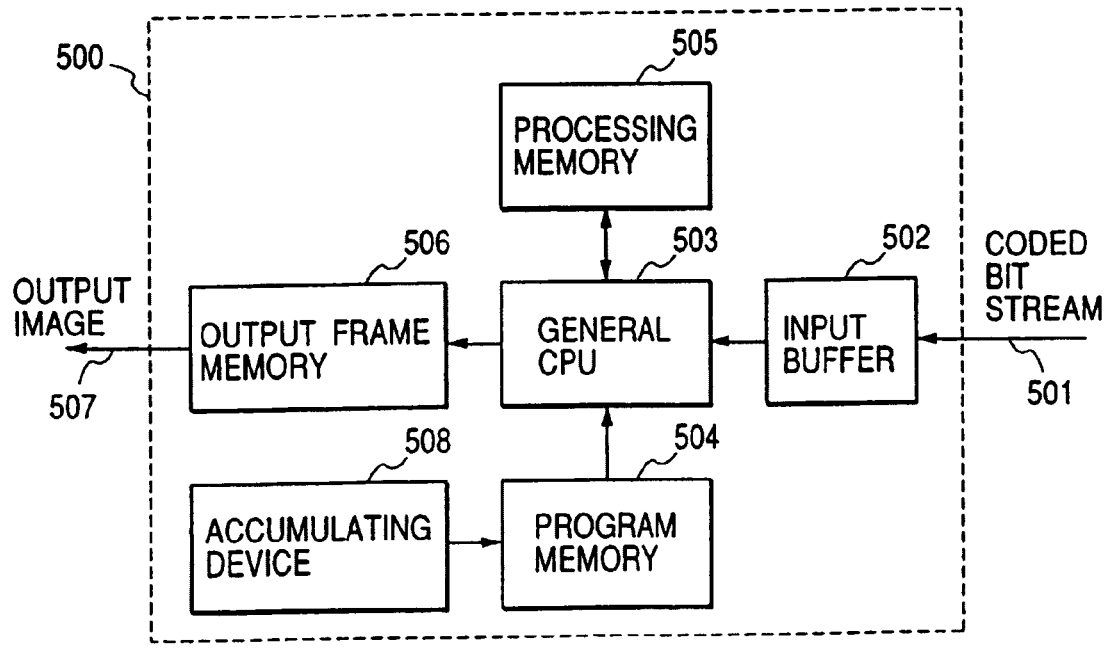
FIG. 5 is a diagram showing a typical construction of the software image decoding device.

FIG. 4 and FIG. 5 respectively show examples of a software image encoder 400 and software image decoder 500. In the software encoder 400, an input image 401 is stored in an input frame memory 402, and a universal processor 403 reads and encodes information from the input frame memory 402. The program required for driving the universal processor 403 is read from an storage device 408 comprising a hard disk or floppy disk, etc., and stored in a program memory 404. The universal processor encodes the information by using a processing memory 405. The encoded information output by the universal processor 403 is then stored in an output buffer 406, and output as an encoded bit stream 407.

Figure 13:
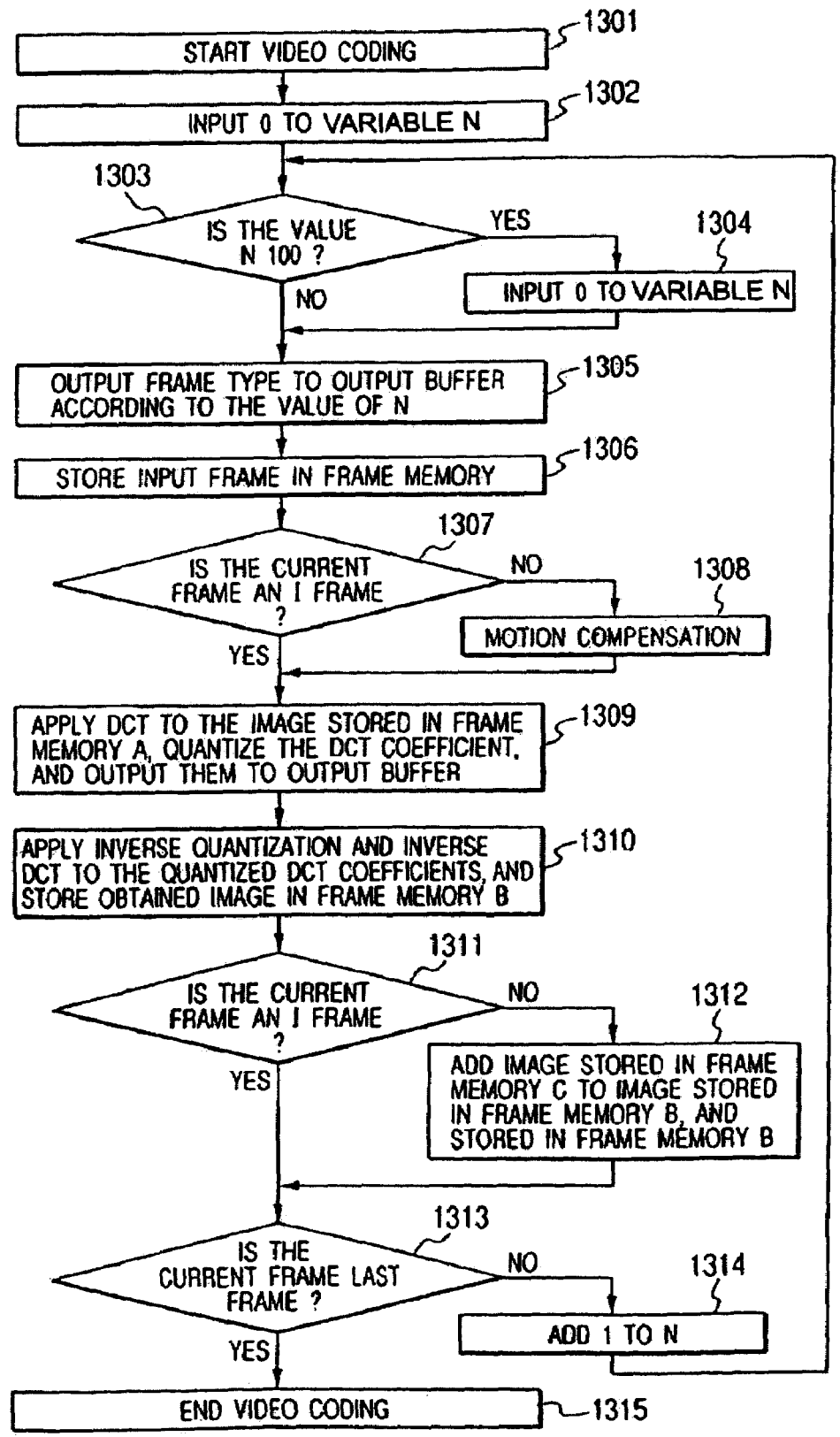
FIG. 13 is a diagram showing an example of a processing flowchart in the software image encoding device.

FIG. 13 shows a flowchart of the encoding software which runs on the software encoder shown in FIG. 4.

First, image encoding is started in a step 1301, and 0 is input to a variable N in a step 1302. Next, if the value of N is 100, in steps 1303, 1304, 0 is input to N. N is a frame number counter which is incremented by 1 whenever processing of one frame is completed, and it can take a value in the range 0–99 when encoding is performed. When the value of N is 0, the frame being encoded is an I frame (motion compensation is not performed, and intraframe coding is performed for all blocks), otherwise it is a P frame (a frame comprising blocks where motion compensation is performed). This means that if the value of N is 100, one I frame is encoded after 99 P frames were encoded. The optimum value of N varies according to the performance of the encoder and the environment in which the encoder is used. In this example, the value 100 was used, but the value of N is not necessarily limited to 100. The determination and output of frame type (I or P) are performed in a step 1305. When the value of N is 0, 'I' is output as frame type identifying information to the output buffer, and thereafter, the frames wherein coding is performed will be I frames.

Herein, the expression "output to output buffer" means that part of the bit stream is output from the encoder to external devices after storing in the output buffer (406 in FIG. 4). When N is not 0, 'P' is output by the output buffer as frame type identifying information, and thereafter, the frames wherein coding is performed will be P frames.

In a step 1306, the input image is stored in a frame memory A. The frame memory A described here denotes part of the memory area of the software encoder (for example, this memory area is reserved in a memory 405 of FIG. 4). In a step 1307, it is determined whether the frame currently being encoded is an I frame. If it is not an I frame, motion estimation/motion compensation is performed in a step 1308.

Figure 14:
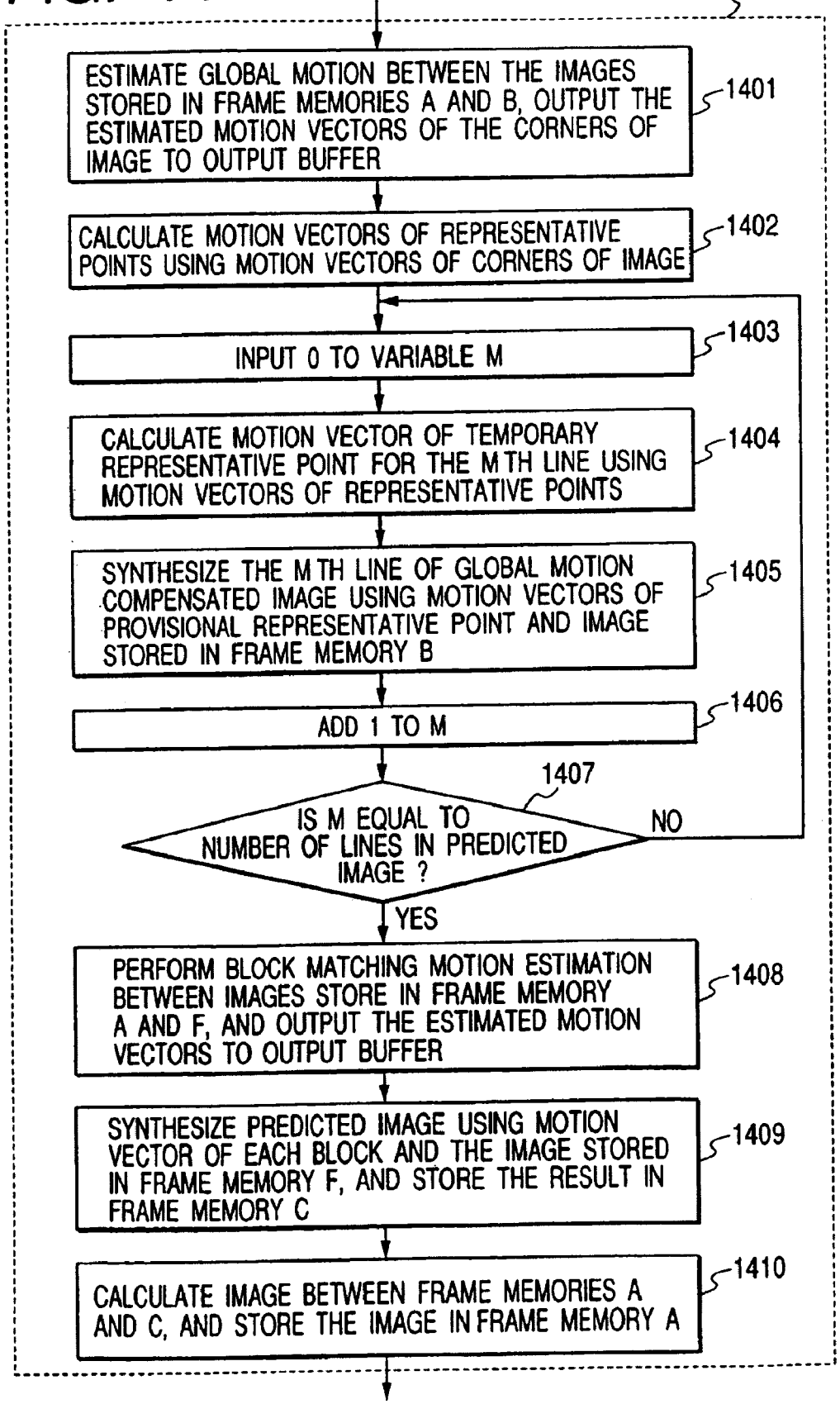
FIG. 14 is a diagram showing an example of a motion compensation processing flowchart in the software image encoding device.

FIG. 14 shows the detailed processing which is performed in this step 1308. First, global motion estimation is performed between the images stored in the frame memories A and B (the decoded image of the immediately preceding frame is stored in a frame memory B) in a step 1401, and the motion vectors of the corners of the image are output as global motion parameters by the output buffer. In a step 1402, the motion vectors of representative points are calculated using the motion vectors of the corners of this image by equations (9), (10). Next, in a step 1403, 0 is input to a variable M. M represents the number of lines in the image. When M is 0, it means that the uppermost line of the image is being processed, and when M is a value obtained by subtracting 1 from the number of lines in the image, it means that the lowermost line of the image is being processed. By using the motion vectors of representative points calculated in the step 1402, the motion vectors of provisional representative points on the Mth line are calculated by equation (11) in a step 1404. Then, making use of the motion vectors of these provisional representative points, the motion vectors of all the pixels in the Mth line are calculated by equation (12), and the Mth line of the global motion compensation predicted image is synthesized using the decoded image of the immediately preceding frame which is stored in the frame memory B according to the calculated motion vectors in a step 1405. In a step 1406, 1 is added to the value of M. In a step 1407, if the value of M is equal to the number of lines in the image, the routine proceeds to a step 1408, and if it is not equal, the routine proceeds to the step 1404. When the processing of the step 1408 starts, the image due to global motion compensation is stored in a frame memory D. In the steps after the step 1408, block matching is performed. First, in the step 1408, motion estimation for every block is performed between the frame memory F and frame memory A (input image), the motion vectors of each block are calculated, and these motion vectors are output to the output buffer. Next, a predicted image is synthesized by block matching in a step 1409 using the motion vectors and the image stored in the frame memory F, and this is stored in a frame memory C as a final predicted image. In a step 1410, a differential image of the frame memories A and C is found, and this is stored in the frame memory A.

Returning now to FIG. 13, immediately before the process in the step 1308 is started, when the current frame is an I frame, the input image is stored in the frame memory A, and when the current frame is a P frame, a differential image between the input image and predicted image is stored in the frame memory A. In the step 1309, DCT is applied to the image stored in this frame memory A, and the DCT coefficients calculated here are output to the output buffer after being quantized. Further, in a step 1310, inverse quantization and inverse DCT are applied to these quantized DCT coefficients, and the image obtained as a result is stored in the frame memory B. Next, in step 1311 it is again determined whether the current frame is an I frame, and when the image is not an I frame, the images in the frame memories B and C are added in a step 1312, and this result is stored in the frame memory B. Here, the encoding of one frame is finished, and the image stored in the frame memory B immediately before processing of a step 1313 is performed is a reconstructed image of the frame for which encoding has just been completed (same as that obtained on the decoding side). In the step 1313, it is determined whether the frame for which coding is complete is the last frame, and if it is the last frame, coding is terminated in step 1315. When it is not the last frame, 1 is added to N in a step 1314, the routine returns to the step 1303 again, and encoding of the next frame is started. It will be understood that although the flowchart described here relates to a method of applying block matching to the global motion compensation predicted image synthesized as a result of performing global motion compensation (method corresponding to a device using a motion compensation processor 801 of FIG. 8), a flowchart relating to a method of performing global motion compensation and global matching in parallel (method corresponding to a device using a motion compensation processor 901 of FIG. 9) can be prepared by making a slight modification.

On the other hand, in the software decoder 500, an input encoded bit stream 501 is first stored in an input buffer 502, and read by a universal processor 503. The universal processor 503 decodes the information using a program memory 504 for storing a program read from an storage device 508 comprising a hard disk or floppy disk, etc., and a processing memory 505. The decoded image obtained is then stored in an output frame memory 506, and output as an output image 507.

Figure 15:
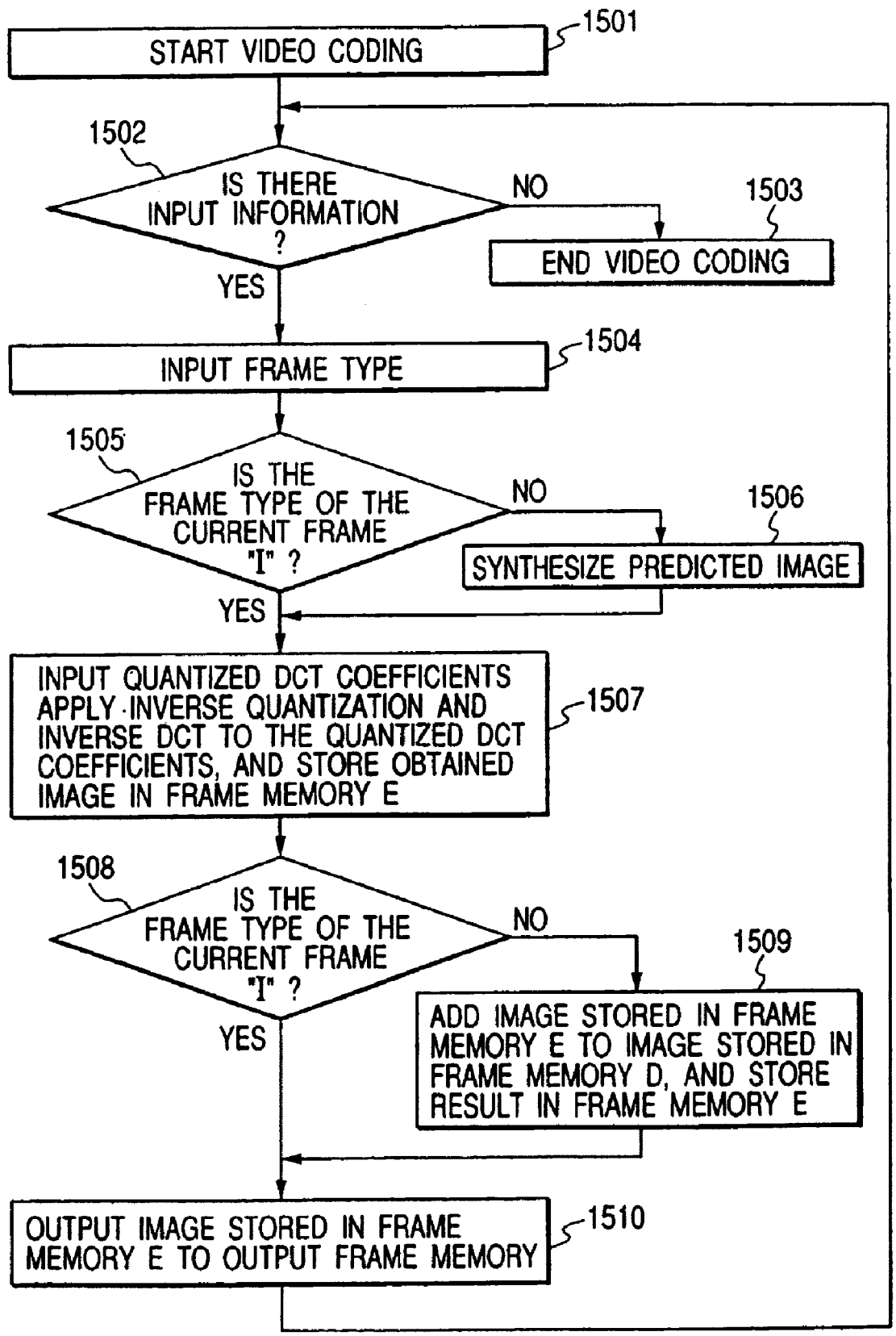
FIG. 15 is a diagram showing an example of a processing flowchart in the software image decoding device.
Figure 16:
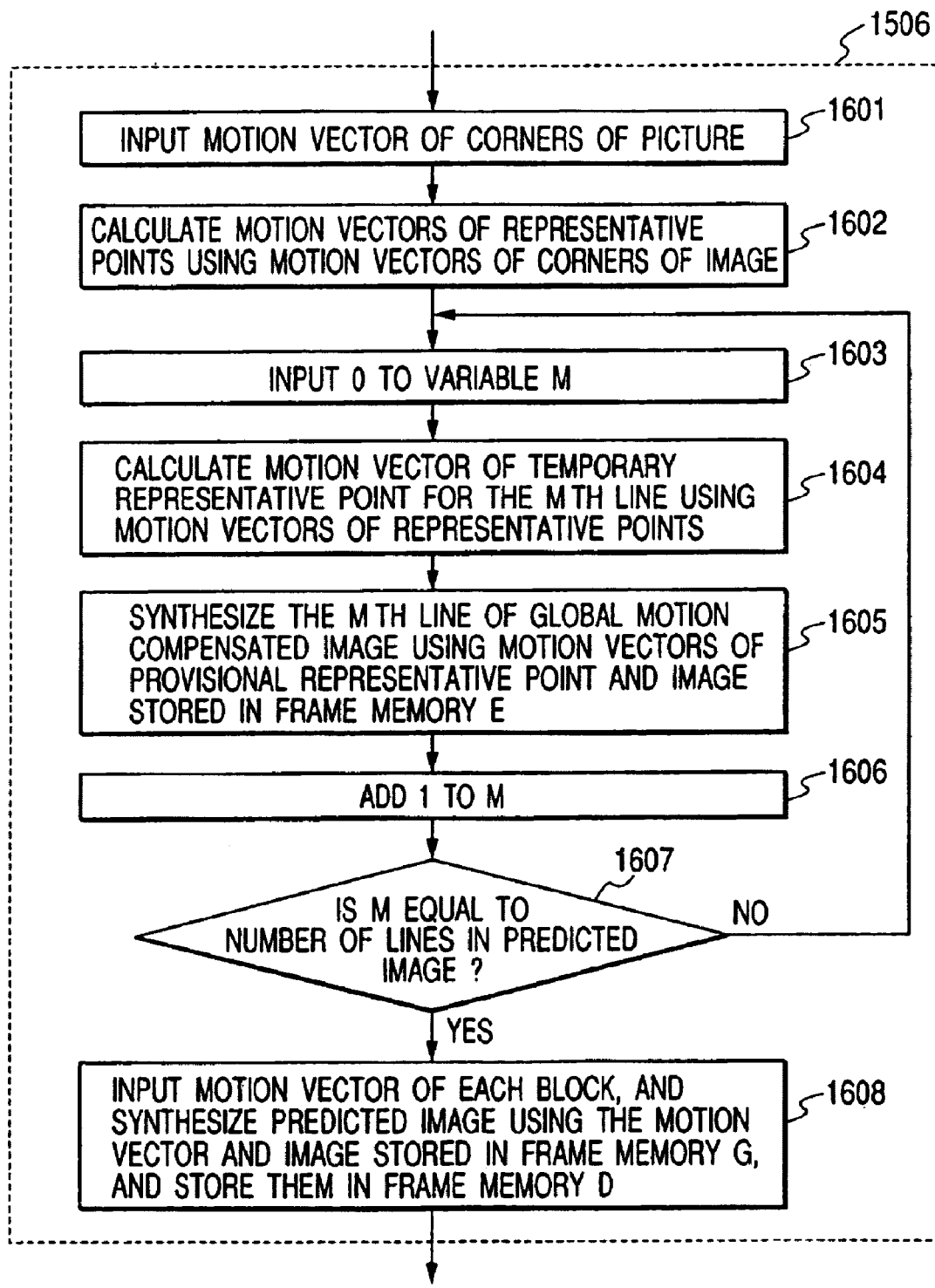
FIG. 16 is a diagram showing an example of a predicted image synthesis flowchart in the software image decoding device.

FIG. 15 shows a flowchart of decoding software which runs on a software decoding device shown in FIG. 5. Processing is started in 1501, and in a step 1502, it is determined whether or not there is input information. Here, if there is no input information, decoding is terminated in a step 1503. When there is input information, frame type information is first input in a step 1504. The term "input" means that information stored in an input buffer 502 is read. In a step 1505, it is determined whether or not the read frame type information is 'I'. When it is not 'I', predicted image synthesis is performed in a step 1506. The details of the processing performed in this step 1506 is shown in FIG. 16.

First, in a step 1601, the motion vectors of the corners of the image are input. In a step 1602, the motion vectors of representative points are calculated by equations (9), (10) using the motion vectors of the corners of this image. Next, in a step 1603, 0 is input to the variable M. M represents the number of lines in the image. When M is zero, it means that the uppermost line of the image is being processed, and when M is a value obtained by subtracting 1 from the number of lines of the image, it means that the lowermost line of the image is being processed. Using the motion vectors of representative points calculated in the step 1602, the motion vectors of provisional representative points on the Mth line are calculated by equation (11) in a step 1604. The motion vectors for all the pixels in the Mth line are calculated by equation (12) in a step 1605. From the calculated motion vectors, the Mth line of the global motion compensation predicted image is synthesized using the decoded image of the immediately preceding frame stored in a frame memory E, and this is stored in a frame memory G. The memory G herein means part of the area of the memory 505 of the software decoder.

In a step 1606, 1 is added to the value of M. If the value of M is equal to the number of lines of the image in a step 1607, the routine proceeds to a step 1608, and if it is not equal, the routine shifts to the step 1604. When the processing of the step 1608 is started, the predicted image due to global motion compensation is stored in the frame memory G. In the step 1608, block matching is performed. Motion vector information for each block is input, the predicted image due to block matching is synthesized using these motion vectors and the image stored in the frame memory G, and this predicted image is stored in the frame memory D.

Returning to FIG. 15, quantized DCT coefficients are input in a step 1507, and the image obtained by applying inverse quantization and inverse DCT to these is stored in the frame memory E. In a step 1508, it is determined whether or not the frame currently being decoded is an I frame. When it is not an I frame, the images stored in the frame memories D and E are added in a step 1509, and the resulting image is stored in the frame memory E. The image stored in the frame memory E immediately prior to performing the processing of the step 1510 is the reproduced image. In the step 1510, the image stored by this frame memory E is output to the output frame memory 506, and output from the decoder as an output image without modification. When decoding of one frame is completed in this way, processing returns again to the step 1502.

When the software image encoder and software image decoder shown in FIG. 4 and FIG. 5 are made to execute a program implementing the method of synthesizing interframe predicted images described in this specification, global motion compensation or warping prediction can be performed with a smaller amount of computation. Compared to the case when this invention is not used, therefore, power consumption is reduced, devices are less costly to manufacture, images with more pixels can be processed in real time, and simultaneous parallel processing can be performed including processing other than encoding and decoding. Moreover, by using the algorithm shown in this specification, compressed image data which could not be reproduced in real time due to limitation of the computing ability of conventional encoders and decoders, can now be reproduced in real time.

The embodiments of this invention described above further comprise the following embodiments.

(1) In conventional image encoding, error coding is performed using discrete cosine transformation or the like after interframe prediction, however this invention may be used for image encoding or decoding when the interframe predicted image is used as the reconstructed image without modification.

(2) In the above description, it was assumed that the shape of the image was rectangular, however the invention may be applied equally well to images having any arbitrary shape other than rectangular. In this case, the processing of the invention may first be applied to a rectangle enclosing an image of arbitrary shape, and a computation performed to calculate motion vectors only of pixels in the image of arbitrary shape.

(3) In the above specification, a motion vector interpolation/extrapolation algorithm was described using two step processing wherein the value of p or q was a non-negative integer power of 2. However this two-step processing algorithm also has the effect of reducing the numerator of a division even when p and q are not non-negative integer powers of 2, and it is therefore effective for preventing overflow of registers.

FIELD OF THE INVENTION

Figure 17:
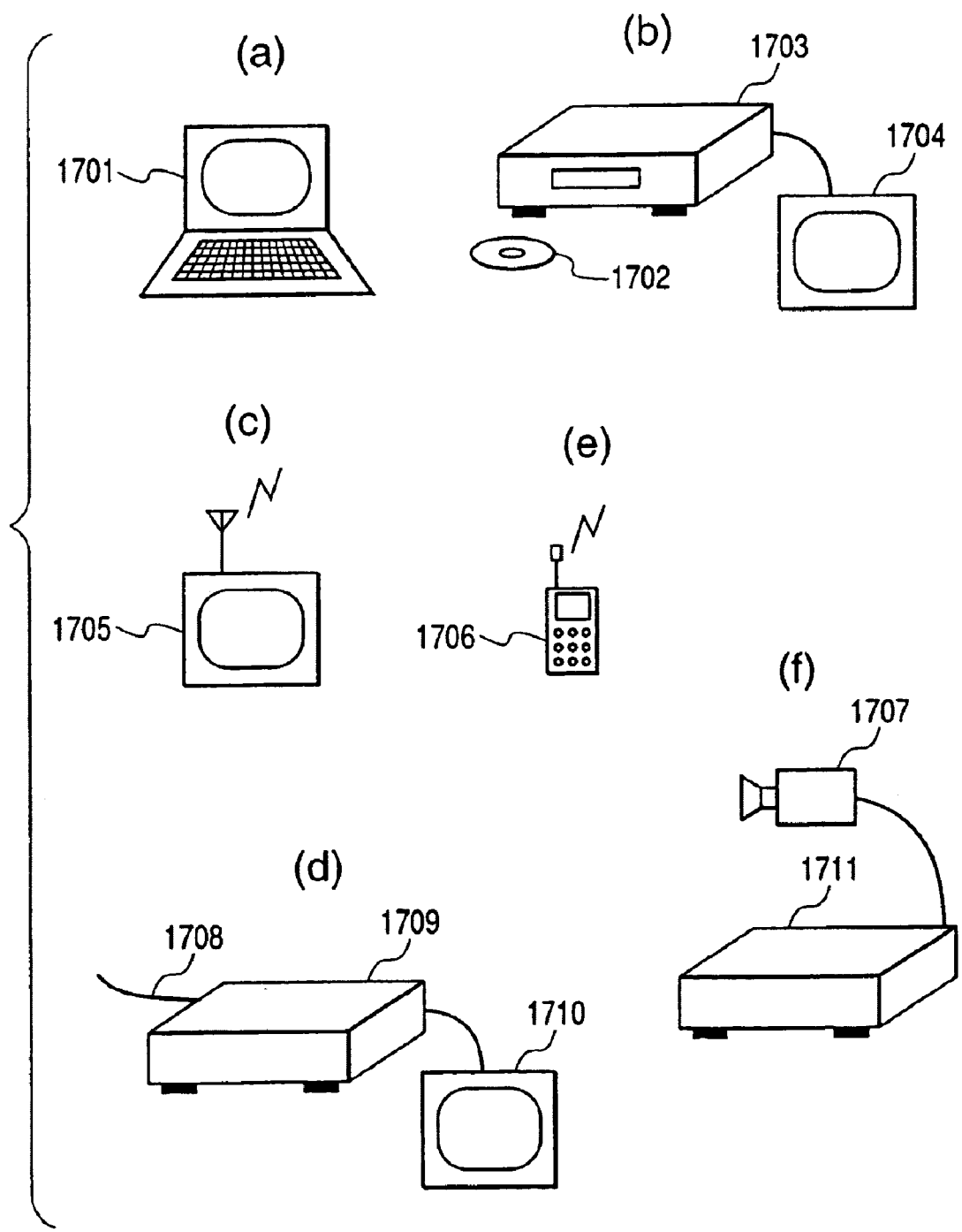
FIG. 17 is a diagram showing a specific example of a device using image encoding/decoding which synthesizes a global motion compensation predicted image by two-stage processing.

FIG. 17 shows specific examples of an encoding/decoding device using the prediction image synthesis method shown in this specification.

(a) shows a case where an image coding/decoding software installed in a personal computer 1701 is used as the image encoding/decoding device. This software is recorded on some type of storage medium (CD-ROM, floppy disk or hard disk, etc.,), and read by the personal computer. Further, by connecting this personal computer to a communication line, the device can be used as an image communication terminal.

(b) shows a case where a coded bit stream comprising moving image information encoded by the method of this invention and recorded on a storage medium 1702 is read and reconstructed by a reproducing device 1703 comprising a device according to this invention, and the reconstructed video signal is displayed on a television monitor 1704. The reproducing device 1703 may also simply read the coded bit stream, the decoding device being built into a television monitor 1704.

(c) shows a case wherein the decoding device of this invention is built into a television receiver 1705 for digital broadcasting.

(d) shows a case wherein the decoder is built into a set-top box 1709 connected to a cable TV cable 1708 or a satellite/terrestrial wave broadcasting antenna, and the image is reproduced on a television monitor 1710.

Instead of the set-top box, the decoder may also be built into the television monitor as in the case of 1704 of (b).

(e) shows a case where the encoder/decoder of this invention is built into a digital portable terminal 1706. The digital portable terminal may be a transmitting/receiving terminal comprising an encoder/decoder, a transmitting terminal only with an encoder, or a receiving terminal only with a decoder.

(f) shows a case where the encoder is built into a camera 1707 for photographing moving images. The camera 1707 may simply acquire a video signal, and the signal be input to a special encoder 1711. In any of the devices or systems shown in the figure, the method described in this specification permits simplification of the device as compared with the case when prior art technology is used.

What is claimed is:

1. A method of synthesizing an interframe predicted image of a current frame from a reference image for encoding/decoding image information to produce motion vectors, comprising:

a first step for calculating values of motion vectors between said interframe predicted image and said reference image for four representative points at coordinates (i,j), (i+p, j), (i, j+q), (i+p, j+q) of said interframe predicted image (where i, j, p, q are integers, the horizontal and vertical components of the motion vectors of the representative points taking the values of integral multiples of 1/k where k is the hk power of 2, and hk is a non-negative integer), a second step for calculating a motion vector of a pixel in said interframe predicted image at coordinates (x+w, y+w) by performing bilinear interpolation/extrapolation on the motion vectors of the four representative points of the interframe predicted image where the pixel sampling interval in both horizontal and vertical directions is 1 and horizontal and vertical coordinates of sampling points are obtained by adding w to integers (where w=wn/wd, wn is a non-negative integer, wd is a hw power of 2, hw is a non-negative integer and wn<wd), where said second step comprises:

a third step for calculating the horizontal and vertical components of motion vector at the coordinates (i, y+w) as numerical values which are respectively integral multiples of 1/z (where z is the power of 2, and hz is a non-negative integer) by linear interpolation/extrapolation of the motion vectors of the representative points at the coordinates (i, j), (i, j+q), and for calculating the horizontal and vertical components of the motion vector at the coordinates (i+p, y+w) as values which are respectively integral multiples of 1/z (where z is the hz power of 2, and hz is a non-negative integer) by linear interpolation/extrapolation of the motion vectors of the representative points at coordinates (i+p, j), (i+p, j+q), and a fourth step for calculating the horizontal and vertical components of the motion vector of the pixel at the coordinates (x+w, y+w) as values which are respectively integral multiples of 1/m (where m is the hm power of 2, and hm is a non-negative integer) found by linear interpolation/extrapolation of two motion vectors at coordinates (i, y+w), (i+p, y+w); and a fifth step of synthesizing said interframe predicted image by calculating the pixel value of said pixel at coordinates (x+w, y+w) in said interframe predicted image using said reference image and said motion vector of said pixel at coordinates (x+w, y+w) calculated in said fourth step.

2. A method of synthesizing an interframe prediction image according to claim 1, wherein, when the motion vector of a pixel at the coordinates (x+w, y+w) are found using (u0, v0), (u1, v1), (u2, v2), (u3, v3), which are the horizontal and vertical components of the motion vectors of the representative points at coordinates (i,j), (i+p, j), (i, j+q), (i+p, j+q) multiplied by k, (uL(y+w), vL(y+w)) which are the horizontal and vertical components of the motion vector at a point having coordinates (i, y+w) multiplied by z, are found by calculating:

$$uL(y+w)=(((q \cdot wd-(y-j) \cdot wd-wn)u0+((y-j) \cdot wd+wn)u2)z)/////(q \cdot k \cdot wd),$$

$$vL(y+w)=(((q \cdot wd-(y-j) \cdot wd-wn)v0+((y-j) \cdot wd+wn)v2)z)/////(q \cdot k \cdot wd)$$

(where //// is a division wherein the computation result is rounded to the nearest integer when the result of an ordinary division is not an integer, and the order of computational priority is equivalent to multiplication and division), (uR(y+w), vR(y+w)) which are the horizontal and vertical components of the motion vector at a point having the coordinates (i+p, y+w) multiplied by z, are found by calculating:

$$uR(y+w)=(((q \cdot wd-(y-j) \cdot wd-wn)u1+((y-j) \cdot wd+wn)u3)z)/////(q \cdot k \cdot wd)$$

$$vR(y+w)=(((q \cdot wd-(y-j) \cdot wd-wn)v1+((y-j) \cdot wd+wn)v3)z)/////(q \cdot k \cdot wd),$$
and (u(x+w, y+w), v(x+w, y+w)) which are the horizontal and vertical components of the motion vector of a pixel at the coordinates (x+w, y+w) multiplied by m, are found by calculating:

$$u(x+w,y+w)=(((p \cdot wd-(x-i) \cdot wd-wn)uL(y+w)+$$
$$((x-i) \cdot wd+wn)uR(y+w))m)//(p \cdot z \cdot wd)$$

$$v(x+w,y+w)=(((p \cdot wd-(x-i) \cdot wd-wn)vL(y+w)+$$
$$((x-i) \cdot wd+wn)vR(y+w))m)//(p \cdot z \cdot wd)$$

(where // is a division wherein the computation result is rounded to the nearest integer when the result of an ordinary division is not an integer, and the order of priority is equivalent to multiplication and division).

3. A method of synthesizing an interframe predicted image according to claim 1, wherein the absolute value of p is the $\alpha$ power of 2 (where a is a non-negative integer).

4. A method of synthesizing an interframe predicted image according to claim 3, wherein $\alpha+hz$ is a positive integral multiple of 8, and w is 0.

5. A method of synthesizing an interframe predicted image according to claim 4, wherein the value of hz is varied according to the value of a so that $\alpha+hz$ is 16 or less for plural different values of $\alpha$.

6. A method of synthesizing an interframe predicted image according to claim 3, wherein $\alpha+hz+hw$ is a positive integral multiple of 8, and w>0.

7. A method of synthesizing an interframe predicted image according to claim 6, wherein the value of hz is varied according to the value of a so that $\alpha+hz+hw$ is 16 or less for plural different values of $\alpha$.

8. A method of synthesizing an interframe predicted image according to claim 1, wherein the absolute values of p and q are respectively the $\alpha$ power of 2 and $\beta$ power of 2 (where $\alpha$, $\beta$ are non-negative integers).

9. A method of synthesizing an interframe predicted image according to claim 1, wherein $z \geq m$.

10. A method of synthesizing an interframe predicted image according to claim 1, wherein $k \geq z$.

11. A method of synthesizing an interframe predicted image according to claim 1, wherein the absolute values of p and q are respectively different from the number of horizontal and vertical pixels in the interframe predicted image.

12. A method of synthesizing an interframe predicted image according to claim 1, wherein, when r is the number of pixels in the horizontal direction and s is the number of pixels in the vertical direction of the interframe predicted image (where r, s are positive integers), 1/2 of the absolute value of p is less than r, the absolute value of p is equal to or greater than r, 1/2 of the absolute value of q is less than s, and the absolute value of q is equal to or greater than s.

13. A method of synthesizing an interframe predicted image according to claim 1, wherein, when r is the number of pixels in the horizontal direction and s is the number of pixels in the vertical direction of the interframe predicted image (where r, s are positive integers), the absolute value of p is equal to or less than r, twice the absolute value of p is larger than r, the absolute value of q is equal to or less than s, and twice the absolute value of q is larger than s.

14. A method of synthesizing an interframe predicted images according to claim 1, wherein,
when the number of pixels in the horizontal and vertical directions of the interframe predicted image is respectively r and s (wherein r and s are positive integers), and the pixels of the interframe predicted image lie in a range wherein the horizontal coordinate is from 0 to less than r and the vertical coordinate is from 0 to less than s, (u0, v0), (u1, v1), (u2, v2), (u3, v3) which is expressed by $$u'(x,y)=(((s \cdot cd-cn-y \cdot cd)((r \cdot cd-cn-x \cdot cd)u_{00}+$$
$$(x \cdot cd+cn)u_{01}+(y \cdot cd+cn)((r \cdot cd-cn-x \cdot cd)u_{02}+$$
$$(x \cdot cd+cn)u_{03}))k)///(r \cdot s \cdot n \cdot cd^2),$$

$$v'(x, y)=(((s \cdot cd-cn-y \cdot cd)((r \cdot cd-cn-x \cdot cd)v_{00}+$$
$$(x \cdot cd+cn)v_{01}+(y \cdot cd+cn)((r \cdot cd-cn-x \cdot cd)v_{02}+$$
$$(x \cdot cd+cn)v_{03}))k)///(r \cdot s \cdot n \cdot cd^2),$$

$u0=u'(i,j)$ $v0=v'(i,j)$ $u1=u'(i+p,j)$ $v1=v'(i+p,j)$ $u2=u'(i,j+q)$ $v2=v'(i,j+q)$ $u3=u'(i+p,j+q)$ $v3=v'(i+p,j+q)$ (where /// is a division wherein the computation result is rounded to the nearest integer when the result of an ordinary division is not an integer, and the order of priority is equivalent to multiplication and division), are used as the k times horizontal and vertical components of motion vectors of representative points (i,j), (j+p, j), (i, j+q), (i+p, j+q), by using (u00, v00), (u01, v01), (u02, v02), (u03, v03) (where u00, v00, u01, v01, u02, v02, u03, v03 are integers), which are n times (where n is a positive integer) motion vectors at the corners of said interframe predicted image situated at coordinates (−c, −c), (r−c, −c), (−c, s−c), (r−c, s−c) (where c=cn/cd, cn is a non-negative integer, cd is a positive integer and cn<cd), whereof the horizontal and vertical components take the values of integral multiples of 1/n.

15. An image encoding method using a method of synthesizing an interframe predicted image comprising:
a sixth step for synthesizing the interframe predicted image according to claim 14, by performing motion compensation using said reference image which is a decoded image of a previously encoded frame and an input image of current frame;
a seventh step for generating a differential image between said interframe predicted image and said input image of said current frame;
a eighth step for transforming said differential image to obtain a transformed signal which is then encoded;
a ninth step for inverse transforming said transformed signal to obtain a decoded differential image, and
a tenth step for synthesizing a decoded image of a current frame by adding said decoded differential image and said interframe predicted image.

16. An image encoding method using a method of synthesizing an interframe predicted image comprising:
a sixth step for synthesizing the interframe predicted image according to claim 1, by performing motion compensation using said reference which is a decoded image of a previously encoded frame and an input image of current frame;
a seventh step for generating a differential image between said interframe predicted image and said input image of said current frame;
a eighth step for transforming said differential image to obtain a transformed signal which is then encoded, a ninth step for applying an inverse transformation to said transformed signal to produce a decoded differential image and a tenth step for generating a decoded image of said current frame by adding said decoded differential image and said interframe predicted image.

17. An image encoding method according to claim 16, wherein the absolute value of p is the $\alpha$ power of 2 (where $\alpha$ is a non-negative integer).

18. An image encoding method according to claim 16, wherein the absolute value of p and q are the $\alpha$ power of 2 and $\beta$ power of 2 (where $\alpha$ and $\beta$ are non-negative integers).

19. An image encoding method according to claim 16, wherein said sixth step comprises a step for extracting and encoding information relating to said motion vectors at the representative points of said interframe predicted image.

20. An image decoding method using a method of synthesizing an interframe predicted image, comprising:

a sixth step for inputting an interframe coding signal of an image frame which is to be decoded and motion vector information concerning said image frame, a seventh step for applying an inverse transformation to said interframe coding signal into a decoded differential signal, a eighth step for producing an interframe predicted image according to claim 1, from the reference image which is a decoded image signal of another image frame different in time from said image frame to be decoded and said motion vector information; and a ninth step for adding the decoded differential signal and said interframe predicted image to obtain a decoded image signal of said image frame which is to be decoded.

21. An image decoding method according to claim 20, wherein the absolute value of p is the $\alpha$ power of 2 (where $\alpha$ is a non-negative integer).

22. An image decoding method according to claim 20, wherein the absolute value of p and q are the $\alpha$ power of 2 and $\beta$ power of 2 (where $\alpha$ and $\beta$ are non-negative integers).

23. An image decoding method according to claim 20, wherein said motion vector information includes said motion vectors at the representative points of said interframe predicted image.

24. An image decoding method according to claim 20, wherein said motion vector information includes said motion vectors at the corners of said interframe predicted image.

25. A method of synthesizing an interframe predicted image of a current frame from a reference image for encoding/decoding image information to produce motion vectors, comprising:

a first step for calculating values of motion vectors between said interframe predicted image and said reference image for four representative points at coordinates (i,j), (i+p, j), (i, j+q) (i+p, j+q) of said interframe predicted image (where i, j, p, q are integers, the horizontal and vertical components of the motion vectors of the representatives points taking the values of integral multiples of 1/k where k is the hk of power 2, and hk is a non-negative integer), a second step for calculating a motion vector of a pixel in said interframe predicted image at coordinates (x+w, y+w) by performing bilinear interpolation/extrapolation on the motion vectors of four representative points of the interframe predicted image where the pixel sampling interval in both horizontal and vertical directions is 1 and horizontal and vertical coordinates of sampling points are obtained by adding w to integers (where w=wn/wd, wn is a non-negative integer, wd is a hw power of 2, hw is a non-negative integer and wn<wd), where the second step comprises:

a third step for calculating the horizontal and vertical components of motion vector at the coordinates (x+w, j) as numerical values which are respectively integral multiples of 1/z (where z is the hz power of 2, and hz is a non-negative integer) by linear interpolation/extrapolation of the motion vectors of the representative points at the coordinates (i, j), (i+p, j), and for calculating the horizontal and vertical components of the motion vector at the coordinates (x+w, j+q) as values which are respectively integral multiples of 1/z (where z is the hz power of 2, and hz is a non-negative integer) by linear interpolation/extrapolation of the motion vectors of the representative points at coordinates (i, j+q), (i+p, j+q), and a fourth step for calculating the horizontal and vertical components of the motion vector of the pixel at the coordinates (x+w, y+w) as values which are respectively integral multiples of 1/m (where m is the hm of power 2, and hm is a non-negative integer), found by linear interpolation/extrapolation of two motion vectors at the coordinates (x+w, j), (x+w, j+q); and a fifth step of synthesizing said interframe predicted image by calculating the pixel value of said pixel at coordinates (x+w, y+w) in said interframe predicted image using said reference image and said motion vector of said pixel at coordinates (x+w, y+w) calculated in said fourth step.

26. A method of synthesizing an interframe predicted image according to claim 25, wherein the absolute value of q is the $\beta$ power of 2 (where $\beta$ is a non-negative integer).

27. A method of synthesizing an interframe predicted image according to claim 26, wherein $\beta$+hz is a positive integral multiple of 8, and w is 0.

28. A method of synthesizing an interframe predicted image according to claim 27, wherein the value of hz is varied according to the value of $\beta$ so that $\beta$+hz is 16 or less for plural different values of $\beta$.

29. A method of synthesizing an interframe predicted image according to claim 26, wherein $\beta$+hz+hw is a positive integral multiple of 8, and w>0.

30. A method of synthesizing an interframe predicted image according to claim 29, wherein the value of hz is varied according to the value of $\beta$ so that $\beta$+hz+hw is 16 or less for plural different values of $\beta$.

31. A method of synthesizing an interframe predicted image according to claim 25, wherein the absolute values of p and q are respectively the $\alpha$ power of 2 and $\beta$ power of 2 (where $\alpha$, $\beta$ are non-negative integers).

* * * * *

UNITED STATES PATENT AND TRADEMARK OFFICE
CERTIFICATE OF CORRECTION

PATENT NO. : 7,006,571 B1 Page 1 of 1
APPLICATION NO. : 09/445088
DATED : February 28, 2006
INVENTOR(S) : Y. Nakaya It is certified that error appears in the above-identified patent and that said Letters Patent is hereby corrected as shown below:

Title Page should read

-- (73) Assignee: RENESAS TECHNOLOGY CORPORATION, Tokyo (JP) --

Signed and Sealed this

Eighteenth Day of September, 2007

JON W. DUDAS
*Director of the United States Patent and Trademark Office*